(12) United States Patent
Kanno

(10) Patent No.: US 10,248,322 B2
(45) Date of Patent: Apr. 2, 2019

(54) MEMORY SYSTEM

(71) Applicant: Toshiba Memory Corporation, Minato-ku, Tokyo (JP)

(72) Inventor: Shinichi Kanno, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 37 days.

(21) Appl. No.: 15/063,813

(22) Filed: Mar. 8, 2016

(65) Prior Publication Data
US 2016/0364142 A1 Dec. 15, 2016

(30) Foreign Application Priority Data
Jun. 12, 2015 (JP) .................................. 2015-119242

(51) Int. Cl.
*G06F 12/02* (2006.01)
*G06F 3/06* (2006.01)

(52) U.S. Cl.
CPC .............. *G06F 3/061* (2013.01); *G06F 3/064* (2013.01); *G06F 3/0679* (2013.01); *G06F 12/0246* (2013.01); *G06F 2212/1008* (2013.01); *G06F 2212/1016* (2013.01); *G06F 2212/7201* (2013.01); *G06F 2212/7205* (2013.01); *G06F 2212/7209* (2013.01)

(58) Field of Classification Search
None
See application file for complete search history.

(56) References Cited

U.S. PATENT DOCUMENTS

| | | | | |
|---|---|---|---|---|
| 8,825,984 | B1* | 9/2014 | Srinivasan | G06F 12/1027 711/206 |
| 9,405,703 | B2* | 8/2016 | Loh | G06F 12/1054 |
| 2015/0074336 | A1* | 3/2015 | Nemoto | G06F 3/0619 711/103 |
| 2015/0278085 | A1* | 10/2015 | Bybell | G06F 12/1063 711/205 |
| 2015/0278112 | A1* | 10/2015 | Gschwind | G06F 12/1045 711/205 |
| 2017/0315910 | A1* | 11/2017 | Greiner | G06F 3/067 |

FOREIGN PATENT DOCUMENTS

| JP | 2004-151939 | 5/2004 |
|---|---|---|
| JP | 2009-211216 A | 9/2009 |

* cited by examiner

*Primary Examiner* — Brian R Peugh
(74) *Attorney, Agent, or Firm* — White & Case LLP

(57) ABSTRACT

According to one embodiment, a memory system is connectable to a host. The memory system includes a nonvolatile memory and a control circuit. The control circuit executes data transfer between the host and the first memory and managing translation information indicating a relation between logical location information and physical location information. The logical location information is location information designated from the host. The physical location information is location information physically indicating location in the first memory. The control circuit separates out the translation information into a plurality of levels in a hierarchy. The translation information includes first translation information which belongs to the first level in the hierarchy and second translation information which belongs to the second level in the hierarchy. The size of the first translation information and the size of the second translation information are the same.

15 Claims, 15 Drawing Sheets

MEMORY SYSTEM

CROSS-REFERENCE TO RELATED APPLICATIONS

This application is based upon and claims the benefit of priority from Japanese Patent Application No. 2015-119242, filed on Jun. 12, 2015; the entire contents of which are incorporated herein by reference.

FIELD

Embodiments described herein relate generally to a memory system.

BACKGROUND

In the past, a memory system using a NAND-type flash memory as a storage medium is known. The capacity of the storage medium equipped in the memory system tends to increase.

DETAILED DESCRIPTION

In general, according to one embodiment, a memory system is connectable to a host. The memory system includes a nonvolatile memory and a control circuit. The control circuit executes data transfer between the host and the first memory and managing translation information indicating a relation between logical location information and physical location information. The logical location information is location information designated from the host. The physical location information is location information physically indicating location in the first memory. The control circuit separates out the translation information into a plurality of levels in a hierarchy. The translation information includes first translation information which belongs to the first level in the hierarchy and second translation information which belongs to the second level in the hierarchy. The size of the first translation information and the size of the second translation information are the same.

Exemplary embodiments of a memory system will be explained below in detail with reference to the accompanying drawings. The present invention is not limited to the following embodiments.

First Embodiment

Figure 1:
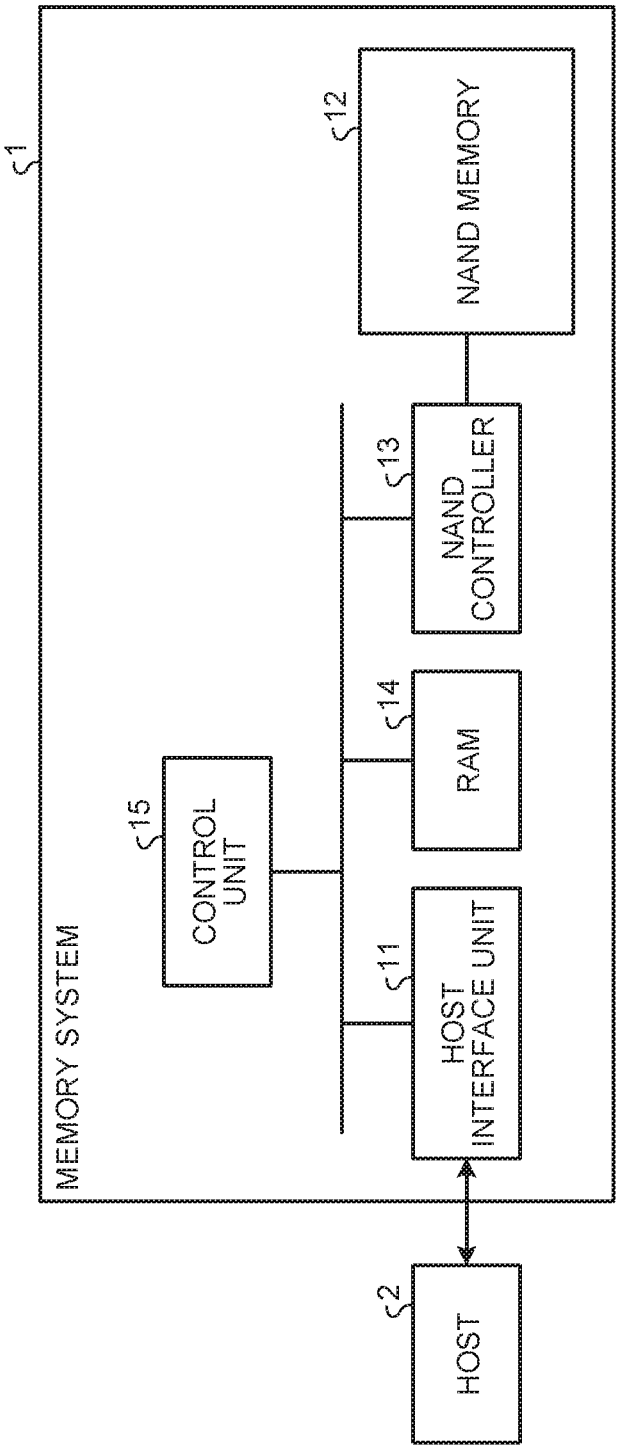
FIG. 1 is a figure illustrating an example of a configuration of a memory system according to a first embodiment.

FIG. 1 is a figure illustrating an example of a configuration of a memory system according to the first embodiment. The memory system 1 is, for example, an SSD (Solid State Drive). Hereinafter, for example, a case where a NAND-type flash memory (hereinafter referred to as a NAND memory) is used as a nonvolatile memory will be explained.

The memory system 1 is configured to be connectable to a host 2. For example, a CPU (Central Processing Unit), a personal computer, a portable information device, a server, and the like correspond to the host 2. Any given interface standard can be employed as an interface standard of communication between the memory system 1 and the host 2. Two or more hosts 2 may be connected to the memory system 1 at a time. The host 2 and the memory system 1 may be connected via a network.

The memory system 1 executes transmission and reception of data to and from the host 2 in accordance with an access command from the host 2. The access command includes a write command and a read command. The access command includes logical location information indicating the access location. For example, an LBA (Logical Block Address) can be employed as the logical location information. For example, in a case where NVMe is employed as the interface standard of communication between the memory system 1 and the host 2, the logical location information may include identification information of the name space and an address logically indicating the location in the name space (for example, an LBA). The name space is a logical address space identified by the identification information of the name space. More specifically, in a case where NVMe is employed, the memory system 1 can manage multiple logical address spaces. The logical location information included in the access command will be hereinafter referred to as a logical address.

The memory system 1 includes a host interface unit 11, a NAND memory 12, a NAND controller 13, a RAM (Random Access Memory) 14, and a control unit 15.

The control unit 15 is configured to include, for example, one or more processors. The control unit 15 executes control of the memory system 1 by executing a program stored at a predetermined location in the memory system 1 in advance.

The storage location of the program is designed in any manner. For example, the program is stored to the NAND memory 12 in advance, and loaded to the RAM 14 during booting. The control unit 15 executes the program loaded to the RAM 14. The control of the memory system 1 is constituted by multiple processing. Some or all of the multiple processing executed by the control unit 15 may be achieved by a hardware circuit. The control unit 15 may be constituted by a control circuit which is a hardware circuit. Each processing executed by the control unit 15 will be explained later.

The host interface unit 11 is an interface device with which the memory system 1 communicates with the host 2. For example, the host interface unit 11 executes transfer of the user data between the host 2 and the RAM 14 under the control of the control unit 15.

The NAND controller 13 is an interface device for access for the NAND memory 12. The NAND controller 13 executes transfer of user data or management information between the RAM 14 and the NAND memory 12 under the control of the control unit 15. Although the details are omitted, the NAND controller 13 can perform error correction processing.

The NAND memory 12 is a nonvolatile storage medium functioning as a storage. The NAND memory 12 is constituted by one or more chips.

Figure 2:
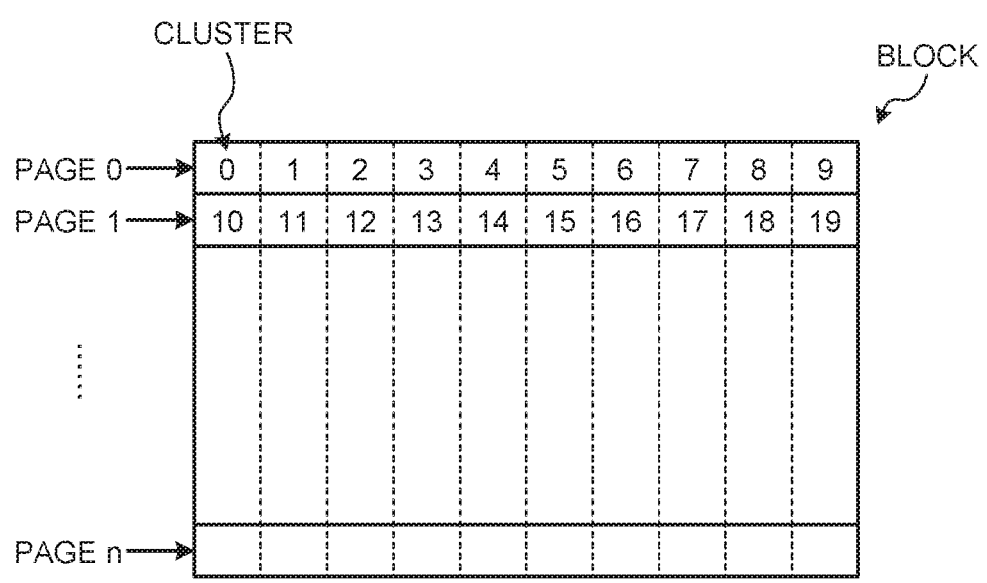
FIG. 2 is a figure schematically illustrating a processing unit of data in a NAND memory and a minimum management unit of a location according to a first embodiment.

FIG. 2 is a figure schematically illustrating the processing unit of data in the NAND memory 12 and the minimum management unit of the location according to the first embodiment. Inside of the chip constituting the NAND memory 12, the storage area of the data is constituted by multiple blocks. Each block is constituted by multiple pages. The page is a unit that can be accessed for writing and reading. The block is the minimum unit with which the data can be erased at a time. In the example of FIG. 2, one block is assumed to be constituted by n (n is a natural number) pages.

Physical location information (physical address) is allocated to a unit smaller than a page. In this case, a unit to which a physical address is allocated is denoted as a cluster. The size of a single cluster may be equal to the minimum access unit from the host 2, or may be different therefrom.

The RAM 14 is a storage medium for temporarily storing data. For example, a type of a storage medium of a higher speed than the NAND memory 12 can be employed as the RAM 14. For example, a volatile or nonvolatile storage medium can be employed as the RAM 14. For example, a DRAM (Dynamic RAM), an SRAM (Static RAM), an FeRAM (Ferroelectric RAM), an MRAM (Magnetoresistive RAM), a PRAM (Phase change RAM), and the like can be employed as the RAM 14.

Figure 3:
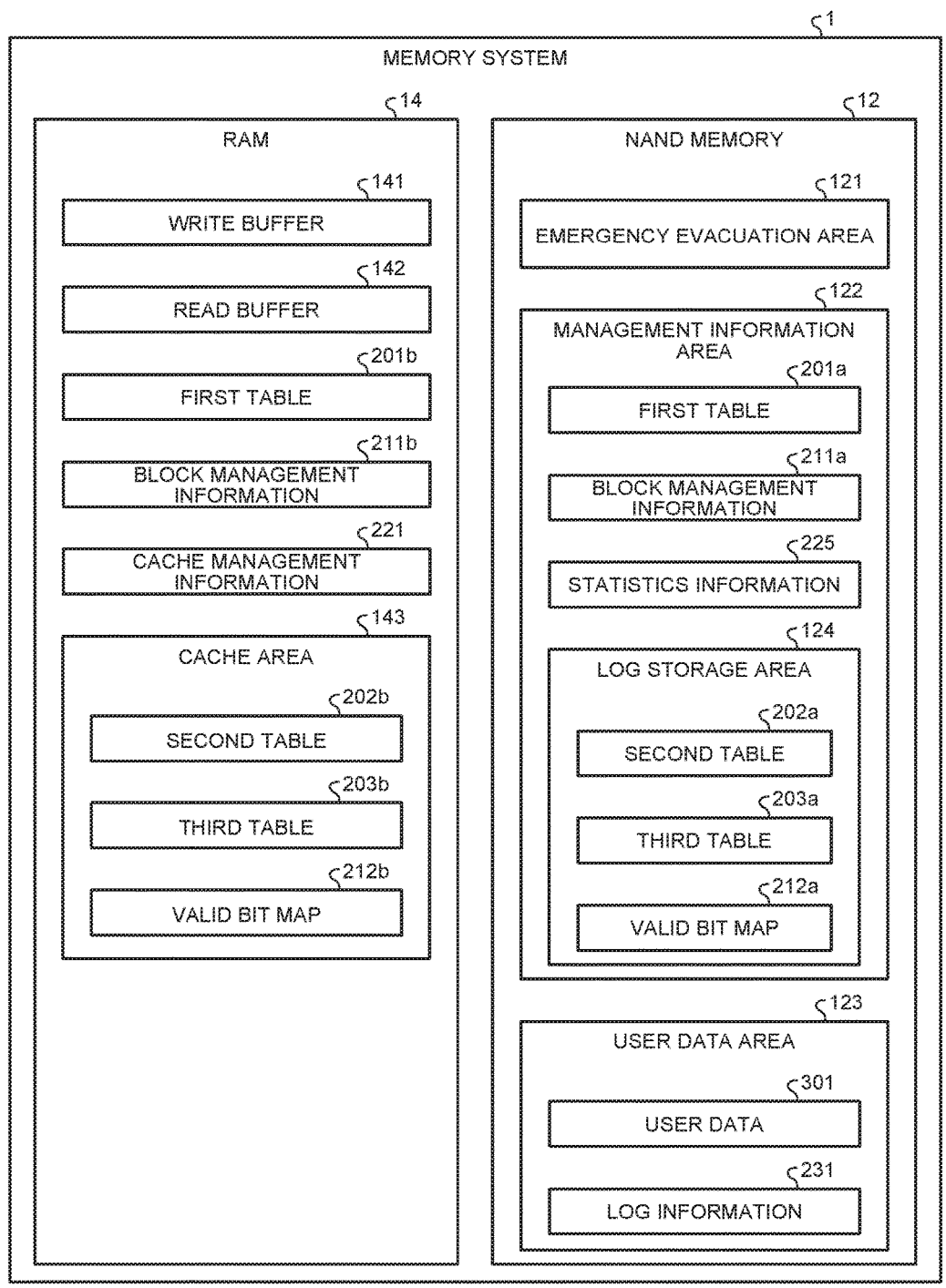
FIG. 3 is a figure illustrating various kinds of information held in a memory system.

FIG. 3 is a figure illustrating various kinds of information held in the memory system 1. An emergency evacuation area 121, a management information area 122, and a user data area 123 are allocated in the NAND memory 12. A log storage area 124 is allocated in the management information area 122.

The user data area 123 stores one or more user data 301. The user data 301 are data requested to be written by the host 2. Each user data 301 has the same size as the size of a single cluster.

A write buffer 141, a read buffer 142, and a cache area 143 are allocated in the RAM 14.

The write buffer 141 and the read buffer 142 are buffers for data transfer between the host 2 and the NAND memory 12. More specifically, the write buffer 141 stores user data received from the host 2 by the host interface unit 11. The user data stored in the write buffer 141 are written to the user data area 123 by the NAND controller 13. The read buffer 142 stores the user data 301 read from the user data area 123 by the NAND controller 13. The user data 301 stored in the read buffer 142 are transferred by the host interface unit 11 to the host 2.

The management information area 122 is an area for storing, in a nonvolatile state, information for managing the memory system 1 (management information). The management information includes translation information, valid information, and statistics information 225.

The translation information is information for associating a logical address and a physical address. In other word, the translation information is information in which a relation between the logical address and the physical address are recorded. Since the logical address is associated with the physical address by the translation information, the host 2 can read, by using a logical address, the user data 301 stored at a location indicated by the physical address corresponding to the logical address. The storage locations of multiple user data 301 stored in the user data area 123 are indicated by any physical address associated with the logical address by the translation information, or are not indicated by any physical address associated with the logical address by the translation information. In the former case, the user data 301 stored at the location indicated by the physical address can be read by the host 2. In the latter case, the user data 301 stored at the location indicated by the physical address cannot be read by the host 2.

The control unit 15 stores the first user data 301 to the first location in the user data area 123. Thereafter, when the user data 301 which are requested to be written together with the designation of the same logical address as the logical address designated when the first user data 301 are written are requested to be written from the host 2, the control unit 15 stores the user data 301, which are requested to be written, to a location different from the first location in the user data area 123. The control unit 15 manages, as a valid state, the state of the second user data 301 which is the latest user data 301 of the user data 301 which are requested to be written with the designation of the same logical address as the logical address designated when the first user data 301 are written. The control unit 15 manages, as an invalid state, the state of the user data 301 other than the second user data 301 of the user data 301 which are requested to be written together with the designation of the same logical address as the logical address designated when the first user data 301 and the first user data 301 are written. It should be noted that the "latest" means that the same logical address is received from the host 2 by the final writing request (excluding however a writing request of atomic write) of the designated writing requests. The control unit 15 associates the logical address with the physical address indicating the storage location of the second user data 301 instead of the first user data 301. In other words, the physical address indicating the storage location of the valid user data 301 is associated with any given logical address by the translation information. The physical address indicating the storage location of the invalid user data 301 is not associated with any of the logical addresses by the translation information. For example, the control unit 15 determines whether the user data 301 are valid or invalid by determining whether the physical address indicating the storage location of the user data 301 is associated with any logical address or not associated any logical address by the translation information.

In recent years, the size of the translation information tends to increase in accordance with the increase of the user capacity of the memory system 1. The user capacity means the total size of the logical address space that the memory system 1 provides to the outside. In order to manage an extremely large size of translation information, the translation information is classified into multiple levels in the hierarchy. Regarding each of the translation information in multiple levels in the hierarchy, the size of the range of the logical address covered by the recorded relation is respectively different. The size of the range of the logical address covered by the relation recorded in the translation information which belongs to the higher level in the hierarchy is larger than the size of the range of the logical address covered by the relation recorded in the translation information which belongs to the lower level in the hierarchy. In other words, the translation information which belongs to the lower level in the hierarchy has finer gains of the recorded relation than the translation information which belongs to the higher level in the hierarchy. The translation information which belongs to the lower level in the hierarchy has the larger number of records than the translation information which belongs to the higher level in the hierarchy, and therefore, the translation information which belongs to the lower level in the hierarchy is divided into more details than the translation information which belongs to the higher level in the hierarchy. In multiple pieces of translation information which belong to the same level in the hierarchy, the sizes of the ranges of the logical addresses covered by the recorded relations are the same.

The storage location of the translation information which belongs to any given level in the hierarchy is indicated by the translation information which belongs to the higher level in the hierarchy by one level than the translation information which belongs to the given level in the hierarchy. To indicate means that, for example, linking with a pointer and the like. For example, the translation information which belongs to the highest level in the hierarchy is read to the RAM 14, and is used on the RAM 14. To use includes a referring to and a changing. The translation information which belongs to a level in the hierarchy except the highest level in the hierarchy is read, as necessary, from the NAND memory 12 to the RAM 14, and is used on the RAM 14. In order to improve the efficiency of writing to the NAND memory 12, it is desired to reduce the size of unit for reading to the RAM 14. In addition, it is desired to reduce the size of area in the RAM 14 storing the translation information which belongs to the highest level in the hierarchy. In order to respond to these demands, the translation information is classified into three or more levels in the hierarchy. In the first embodiment, for example, the translation information is classified into three levels in the hierarchy.

The management information area 122 stores the first table 201a which is the translation information which belongs to the highest level in the hierarchy. The log storage area 124 in the management information area 122 stores the second table 202a which is the translation information which belongs to the second level in the hierarchy and the third table 203a which is the translation information which belongs to the third level in the hierarchy.

Figure 4:
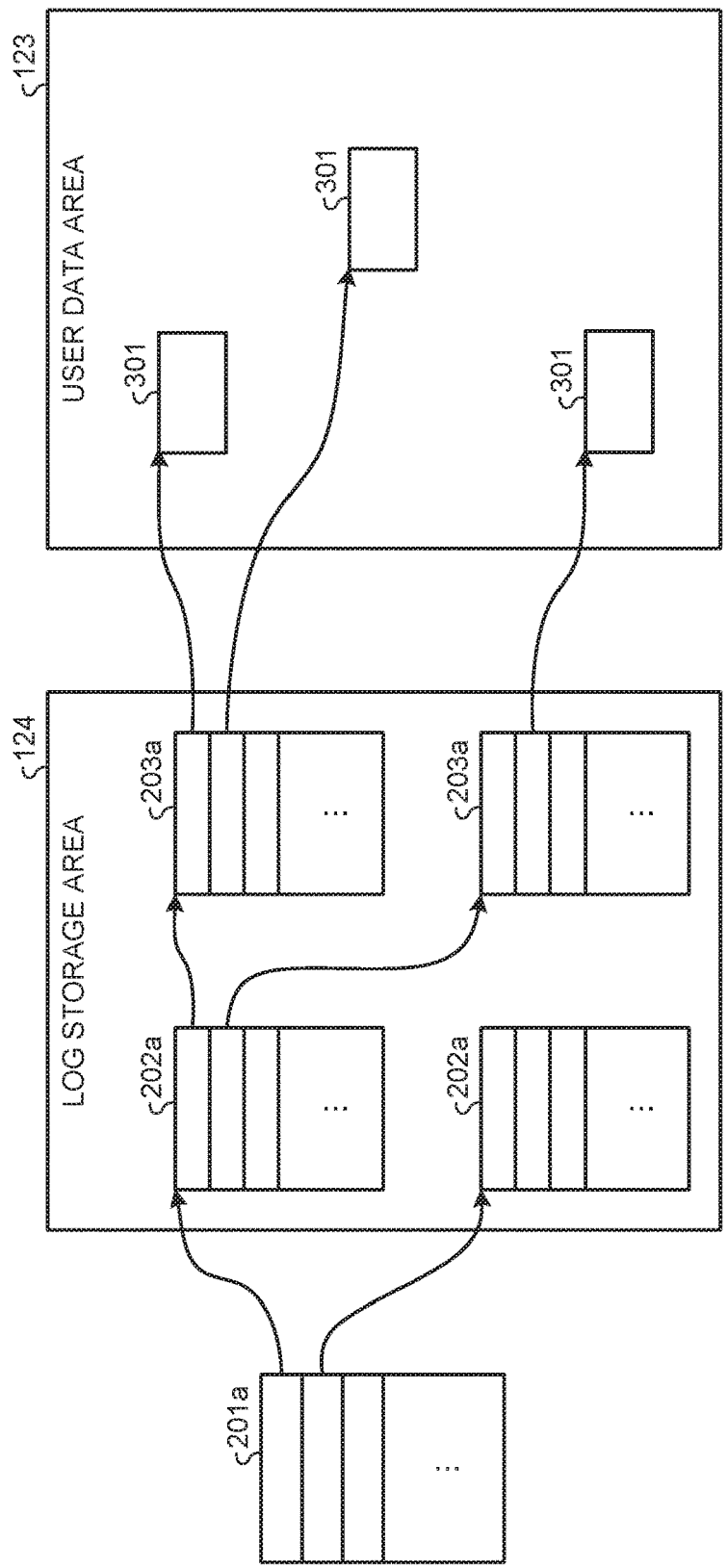
FIG. 4 is a figure for explaining an example of a configuration of various kinds of table.

FIG. 4 is a figure for explaining an example of a configuration of various kinds of table. The logical address space of the memory system 1 is divided into multiple partial spaces (first spaces). Further, each of the first spaces is divided into multiple partial spaces (second spaces). Each of the second spaces is divided into multiple third spaces. The size of each third space is equal to the size of a single cluster.

A single third table 203a has a record for each of the third spaces included in a single second space. Each record constituting a single second table 202a associates a logical address and address information indicating the location where the user data 301 indicated by the logical address are stored (data address). The data address is expressed by, for example, a physical address. In a case where the user data 301 corresponding to any given third space are not stored in the memory system 1, for example, a null value is recorded to a record corresponding to the third space.

The first table 201a includes a record for each of the first spaces. Each record of the first table 201a indicates the location where the second table 202a is stored. In each record of the first table 201a, the location where the second table 202a is stored is indicated by, for example, a format of a physical address.

The second table 202a includes a record for each of the second spaces. Each record of the second table 202a indicates the location where the third table 203a is stored. In each record of the second table 202a, the location where the third table 203a is stored is indicated by, for example, a format of a physical address.

The valid information is information indicating whether each of the user data 301 is valid or invalid. In this case, for example, the valid information is classified into two levels of the hierarchy, which include the block management information 211a which is the valid information which belongs to the first level in the hierarchy and the valid bit map 212a which is the valid information which belongs to the second level in the hierarchy.

Figure 5:
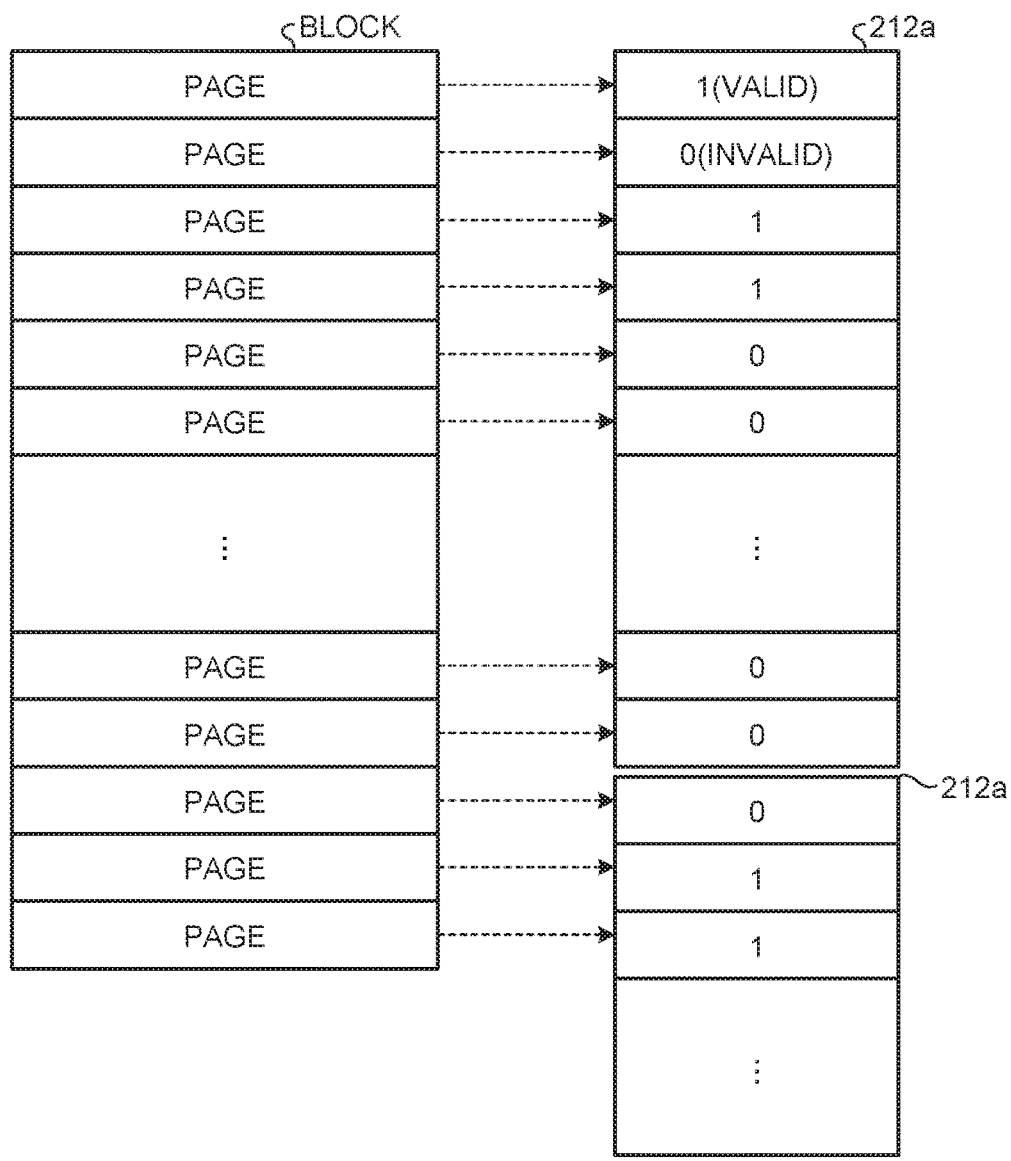
FIG. 5 is a figure for explaining a valid bit map.

FIG. 5 is a figure for explaining the valid bit map 212a. The valid bit map 212a is bit map information constituted by flags describing whether the user data 301 is valid or invalid. A range corresponding to a single flag is designed in any manner. In the example of FIG. 5, in each valid bit map 212a, one-bit flag indicating whether the user data 301 is valid or invalid is recorded for each page. The flags for multiple pages in which the physical addresses are continuous are recorded in each valid bit map 212a. The valid bit map 212a is stored to the log storage area 124.

Figure 6:
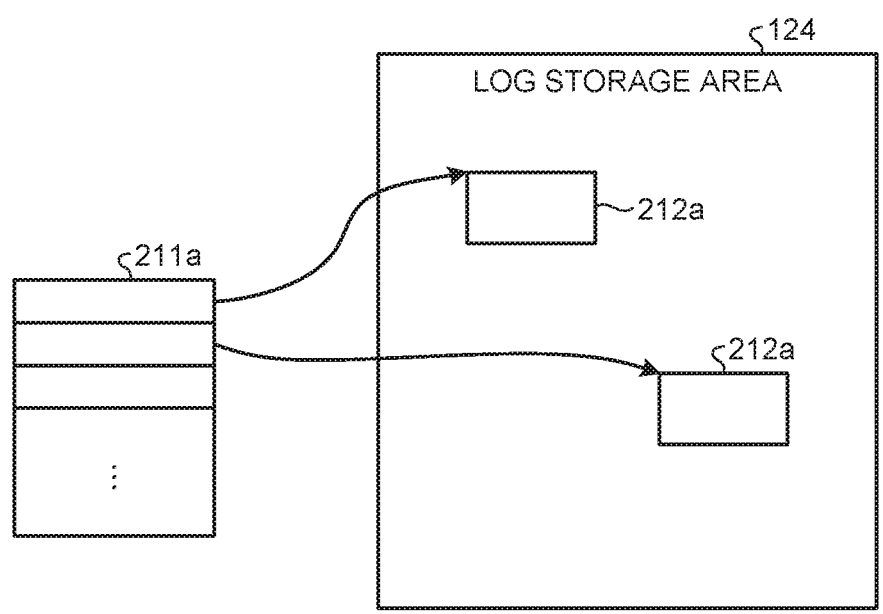
FIG. 6 is a figure for explaining block management information.

FIG. 6 is a figure for explaining the block management information 211a. Each flag recorded in each valid bit map 212a is associated with a physical address. More specifically, for each physical address space constituted by as many pages as the number of the flags recorded in a single valid bit map 212a, the block management information 211a indicates a location where the corresponding block management information 211a is stored. The block management information 211a is stored to the management information area 122.

Figure 7:
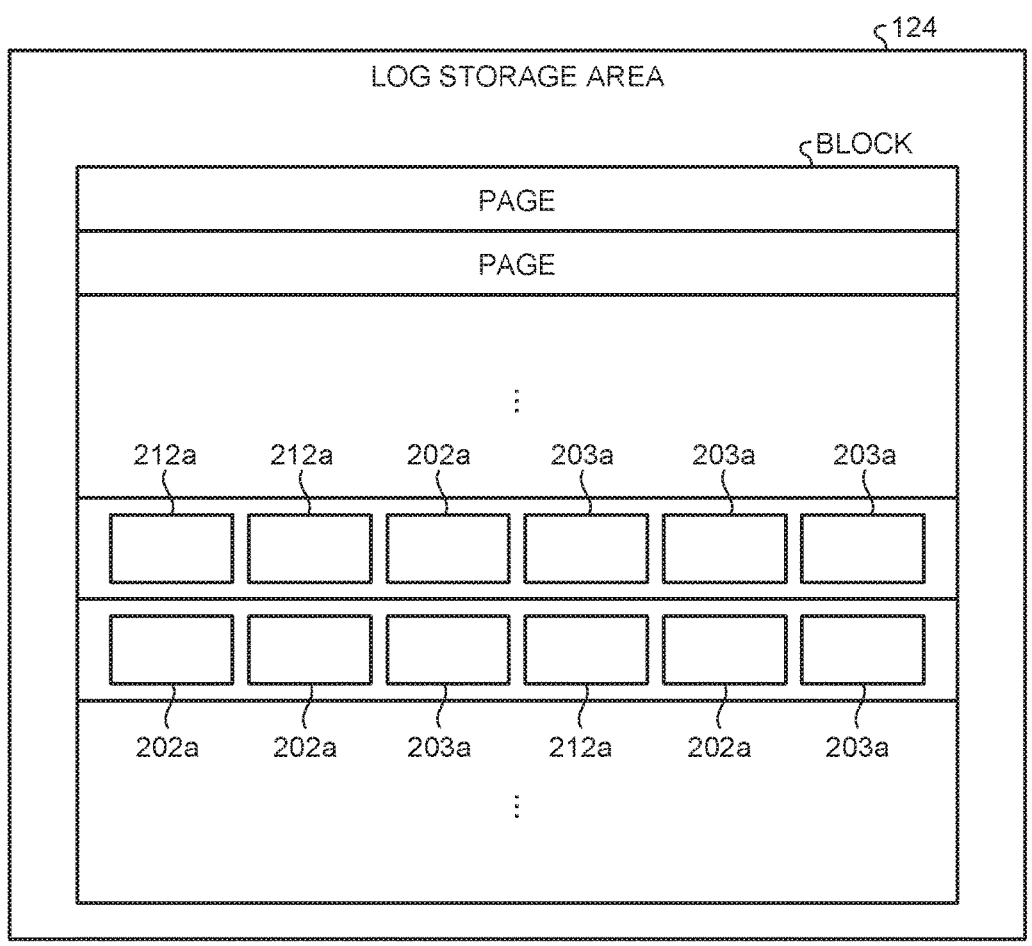
FIG. 7 is a figure illustrating an example of a state of storage of second tables, third tables, and valid bit maps.

FIG. 7 is a figure illustrating an example of a state of storage of the second tables 202a, the third tables 203a, and the valid bit maps 212a. In the first embodiment, the size of the first space and the size of the second space are determined so that the size of a single second table 202a and the size of a single third table 203a are the same. In the first embodiment, the number of flags recorded in a single valid bit map 212a is determined so that the size of a single second table 202a, the size of a single third table 203a, and the size of a single valid bit map 212a are the same. It should be noted that the size of a single second table 202a means the size of the single second table 202a itself as the data. The size of a single third table 203a means the size of the single third table 203a itself as the data. The size of a single valid bit map 212a means the size of the single valid bit map 212a itself as the data. In other words, each of a single second table 202a and a single third table 203a can be stored in an area of substantially the same size. Each of a single second table 202a, a single third table 203a, and a single valid bit map 212*a* can be stored in an area of substantially the same size. Therefore, the log storage area 124 can store the second tables 202*a*, the third tables 203*a*, and the valid bit maps 212*a* in a mixed manner.

More specifically, multiple pieces of different unit information can be stored in a single page. The unit information is the second table 202*a*, the third table 203*a*, or the valid bit map 212*a*. The number of pieces of unit information recorded per page can be caused to be a constant number at all times. Since the size of each unit information is the same, the management of a location on a border between unit information becomes easy. For the identification of the unit information, the size information about the unit information may be unnecessary. In the example of FIG. 7, six pieces of unit information are stored in a single page.

Each unit information is read out to the cache area 143 for using. In other words, each unit information is cached in the cache area 143. To use is a referring to or a changing. The second table 202*a* existing in the cache area 143 will be referred to as a second table 202*b*. The third table 203*a* existing in the cache area 143 will be referred to as a third table 203*b*. The valid bit map 212*a* existing in the cache area 143 will be referred to as a valid bit map 212*b*.

The unit information cached in the cache area 143 becomes in a state different from the unit information stored in the log storage area 124 due to the change by the control unit 15. The state of the unit information cached in the cache area 143 different from the unit information stored in the log storage area 124 will be referred to as dirty. The dirty unit information is written back to the log storage area 124 with predetermined timing. The dirty unit information is written to the log storage area 124, so that it transits to a non-dirty state.

The first table 201*a* is read out to the RAM 14, and is used on the RAM 14. The first table 201*a* read to the RAM 14 will be denoted as a first table 201*b*. The block management information 211*a* is read to the RAM 14, and is used on the RAM 14. The block management information 211*a* read to the RAM 14 will be denoted as block management information 211*b*. The first table 201*b* and the block management information 211*b* stored in the RAM 14 are respectively used by the control unit 15, and copied to the management information area 122 with predetermined timing of the memory system 1.

In a case where the corresponding second table 202*b* is cached in the cache area 143, each record of the first table 201*b* stored in the RAM 14 further indicates the location where the corresponding second table 202*b* is cached. In a case where the corresponding third table 203*b* is cached in the cache area 143, each record of the second table 202*b* cached in the cache area 143 further indicates the location where the corresponding third table 203*b* is cached. In a case where the corresponding user data are stored to the write buffer 141, each record of the third table 203*b* cached in the cache area 143 indicates the location where the corresponding user data are stored in the write buffer 141.

In a case where the corresponding valid bit map 212*b* is cached in the cache area 143, each record of the block management information 211*b* stored in the RAM 14 further indicates the location where the corresponding valid bit map 212*b* is cached.

The dirty unit information is managed by the cache management information 221.

Figure 8:
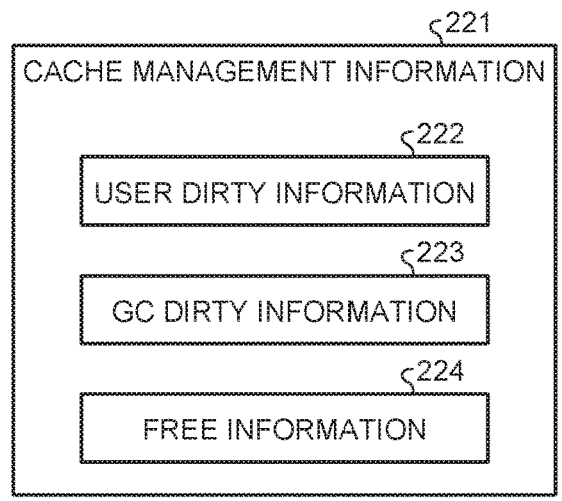
FIG. 8 is a figure illustrating a configuration of cache management information.

FIG. 8 is a figure illustrating a configuration of the cache management information 221. The cache management information 221 is information for managing the cache area 143. The cache management information 221 is, for example, stored to the RAM 14, and is used on the RAM 14. The cache management information 221 includes user dirty information 222, GC dirty information 223, and free information 224. The user dirty information 222 is information indicating the second table 202*b* and the third table 203*b* that have become dirty in accordance with writing of the user data 301 from the write buffer 141 to the user data area 123. The user dirty information 222 may be configured to further indicate the valid bit map 212*b* that has become dirty in accordance with writing of the user data 301 from the write buffer 141 to the user data area 123. The GC dirty information 223 is information indicating the second table 202*b* and the third table 203*b* that have become dirty in accordance with garbage collection. The GC dirty information 223 may be configured to further indicate the valid bit map 212*b* that has become dirty in accordance with garbage collection. The free information 224 is information indicating a cache line that is not used. It should be noted that, for example, a single piece of unit information is cached in a single cache line. The user dirty information 222 and the GC dirty information 223 indicate dirty unit information in such state that the order of becoming dirty can be recognized. For example, the user dirty information 222 and the GC dirty information 223 include a data structure of a linked list. The free information 224 indicates a non-used cache line in such a state that the order of being non-used state can be recognized. For example, the free information 224 includes a data structure of a linked list. In a case where the free information 224 includes a data structure of a linked list, the order in which the cache line has become a not-used state can be expressed by, for example, an order of a link.

It should be noted that management of dirty/non-dirty state is executed also for the first table 201*b* and the block management information 211*b*. For example, in a case where the first table 201*b* is different from the first table 201*a*, the first table 201*b* is treated as dirty. For example, a record different from a corresponding record of multiple records constituting the first table 201*a* in multiple records constituting the first table 201*b* may be managed as dirty. For example, in a case where the block management information 211*b* is different from the block management information 211*a*, the block management information 211*b* may be managed as dirty. For example, only a record different from a corresponding record of multiple records constituting the block management information 211*a* in multiple records constituting the block management information 211*b* may be managed as dirty. In a case where, for example, the number of records that have become dirty in the first table 201*b* is more than a predetermined number, the first table 201*b* at that point in time is written to the management information area 122 as the first table 201*a*. In a case where, for example, the number of records that have become dirty in the block management information 211*b* is more than a predetermined number, the block management information 211*b* at that point in time is written to the management information area 122 as the block management information 211*a*. The state of each record in the first table 201*b* and the block management information 211*b* transits to non-dirty in accordance with writing to the management information area 122.

The statistics information 225 is various kinds of information indicating the operation state. For example, the statistics information 225 includes the usage situation of the NAND memory 12, the usage situation of the memory system 1, the power-ON time, the number of times the loss of dirty information occurs due to power-OFF, the number of times of operations of power loss protection (PLP), the number of times normal power-OFF occurs, and the like. In this case, the normal power-OFF means power-OFF in which the loss of the dirty information does not occur. The PLP means processing in which, in a case where the electric power supply from the outside is suddenly stopped, the control unit 15 stores at least the dirty translation information in the RAM 14 to the emergency evacuation area 121. In the PLP, the user data in the write buffer 141 are also the target of the storage. In the PLP, the control unit 15 may dump the memory image in the RAM 14 to the emergency evacuation area 121 as it is. The PLP is executed using electric power accumulated in a battery (not illustrated) included in the memory system 1. The control unit 15 generates statistics information 225 in the RAM 14, and dumps the generated statistics information 225 to the management information area 122 with a regular interval of time.

In the user data area 123, not only the user data 301 but also one or more pieces of log information 231 are stored by the control unit 15. The log information 231 is information recorded in association with the user data 301 when the user data 301 are written to the user data area 123. The log information 231 records at least the logical address indicating the location of the corresponding user data 301, the physical address associated with the logical address before the corresponding user data 301 are written (old physical address), and the physical address indicating the location of the writing destination of the corresponding user data 301 (new physical address).

Subsequently, each processing executed by the control unit 15 will be explained.

(1) Basic Operation

The processing executed by the control unit 15 is roughly classified into processing during booting, processing of command waiting, processing of command execution, and processing of re-booting.

(1-1) Processing During Booting

The control unit 15 executes initialization operation as a scheduler during booting. Thereafter, the control unit 15 registers any one of the following processing (first to third start up processing) to the scheduler. The control unit 15 executes the registered start up processing in accordance with a command of the scheduler.

(1-1-1) First Start Up Processing

In a case where the dirty unit information is lost due to power-OFF, the first start up processing is executed. The first start up processing is processing for restructuring the translation information. The restructuring includes restoring the dirty unit information that has been lost. The restructuring can be executed by referring to the log information 231 in the order of writing or in the order opposite to the order of writing.

(1-1-2) Second Start Up Processing

In a case where various kinds of information are stored to the emergency evacuation area 121 due to PLP and the like in the power-OFF immediately before, the second start up processing is executed. The second start up processing is processing for restoring the memory image of the RAM 14 by using various kinds of information stored in the emergency evacuation area 121.

(1-1-3) Third Start Up Processing

In a case where all the dirty unit information has been normally written to the management information area 122, and the memory system 1 transits to the non-dirty state during power-OFF, then the third start up processing is executed. The third start up processing is processing for reading the first table 201a to the RAM 14 as the first table 201b.

(1-2) Processing of Command Waiting

The control unit 15 executes processing as an interrupt handler. In accordance with a command from the host 2, the interrupt handler registers the corresponding processing to the scheduler. The command is transmitted when the corresponding processing is executed by the scheduler. The command execution is also started when the interrupt handler in the memory system 1 registers the corresponding processing to the scheduler. When there is no executable command, the control unit 15 may cause the state of the memory system 1 into the state of sleep. Even when the memory system 1 is in the state of sleep, the control unit 15 may execute the timer interruption. With the timer interruption, the control unit 15 causes the state of the memory system 1 to transit to the normal state from the state of sleep.

(1-3) Processing of Command Execution (1-3-1) Host Command Queue Processing

The host command queue processing is, for example, implemented as the interrupt handler in the control unit 15. A command from the host 2 is notified by the interruption. The host command queue processing includes processing for analyzing the command from the host 2 and processing for registering the command to an issuing waiting command queue (not illustrated). The issuing waiting command queue is, for example, a ring-type queue. In the host command queue processing, the control unit 15 can execute only the registration on the issuing waiting command queue. The number of commands in the issuing waiting state in the issuing waiting command queue can be calculated by comparing the location information about the registering side and the location information about the issuing side. The issuing waiting state means that a command had already been registered to the issuing waiting command queue but has not yet issued from the issuing waiting command queue. In the host command queue processing, in a case where the number of commands in the issuing waiting state is more than a predetermined threshold value, the control unit 15 stops reception of a command from the host 2. In the host command queue processing, in a case where registration of a command is requested from the host 2 while the reception of a command from the host 2 is not accepted, the control unit 15 notifies a reception rejection to the host 2. In a case where the host 2 receives a notification of a reception rejection, the host 2 requests registration of the command again after a predetermined period of time passes. In a case where the reception of a command is not accepted when the registration is requested again, the control unit 15 receives the command in the host command queue processing. The difference between the number of commands in issuing waiting state in the issuing waiting command queue and the predetermined threshold value denotes the number of commands that can be received. In the host command queue processing, the control unit 15 may transmit the number of commands that can be received to the host 2 as the status information. Which of the notification of the reception rejection and the notification of the number of commands that can be received is used is set by an agreement with the host 2. In the host command queue processing, the control unit 15 registers the host command issuing processing to an execution waiting queue (not illustrated) of the scheduler, and terminates the host command queue processing. Each of the registered commands is managed together with information indicating an execution state (not-yet executed state, execution state, and end waiting state). When the command is in the not-yet executed state, this means a state in which the command has not yet been executed. When the command is in the execution state, this means a state in which the command is being executed. When the command is in the end waiting state, this means a state from when the operation corresponding to the command is terminated to when the command is deleted from the execution waiting queue.

(1-3-2) Host Command Issuing Processing

After receiving a command from the host 2, an execution request of host command issuing processing is registered to the scheduler when the command is terminated or upon the timer interruption and the like. In the host command issuing processing, the control unit 15 causes the state of the command of which execution request is registered in the scheduler to be transited to the execution state. For example, when the execution of the command is terminated, e.g., the transfer of the data is finished, the control unit 15 causes the state of the command to be transited to the end waiting state. Thereafter, in accordance with reception of an execution end confirmation from the host 2, the control unit 15 deletes the command from the issuing waiting command queue. The control unit 15 starts execution of the command in the not-yet executed state.

(1-3-3) Read Processing

The read processing includes processing for analyzing a command, processing for accessing translation information, processing for reading user data 301 from the NAND memory 12, processing for storing the user data 301, which have been read from the NAND memory 12, to the read buffer 142, processing for transmitting the user data 301, which have been stored in the read buffer 142, to the host 2, and processing for notifying a command execution termination to the host 2. In the read processing, the control unit 15 notifies the termination of the command to the host command issuing processing after the host 2 confirms the command execution termination.

(1-3-4) Write Processing

The write processing includes processing for analyzing a command, processing for notifying a command execution to the host 2, processing for storing the user data from the host 2 to the write buffer 141, processing for updating the translation information in accordance with the storage of the user data to the write buffer 141, and processing for notifying the command execution termination to the host 2. In a case where a designation of an FUA mode is included in a write command, the control unit 15 further executes, in the write processing, processing for storing the user data stored in the write buffer 141 to the NAND memory 12 and processing for updating the translation information in accordance with the storage of the user data to the NAND memory 12. In the write processing, the control unit 15 notifies the termination of the command to the host command issuing processing after the host 2 confirms the command execution termination.

(1-3-5) Cache Flush Processing

The cache flush processing is processing for executing flush of the write buffer 141 and flush of the dirty portion of the translation information. When the cache flush is notified, the control unit 15 stops, in the cache flush processing, issuing of a subsequent write command until a writing execution flag to the write buffer 141 has been set. The writing execution flag is flag information indicating whether the user data stored in the write buffer 141 are written to the NAND memory 12 or not. The state in which the writing execution flag has been set indicates that the corresponding user data have been written to the NAND memory 12. In a case where NVMe is employed, the control unit 15 may independently execute the cache flush processing for each name space.

(1-3-6) Trim Processing

The trim processing is processing for solving, with regard to the designated logical address, a relation between the logical address and a physical address. In the trim processing, the control unit 15 stops issuing a new write command and a new read command, and the corresponding record included in the translation information is invalidated. In a case where NVMe is employed, for example, the trim command may be configured to be able to designate a name space. In the trim processing, the control unit 15 stops issuing a write command and a read command for the designated name space.

(1-3-7) Emergency Evacuation Processing

The emergency evacuation processing includes processing for discarding a command in issuing waiting state and all the access commands being executed, and processing for storing all the dirty portion of the user data and the translation information in the write buffer 141 to the emergency evacuation area 121. In the emergency evacuation processing, in a case where the above information is successfully stored, the control unit 15 clears an Unexpected Shutdown flag. In the emergency evacuation processing, in a case where the above information has been failed to be stored, the control unit 15 does not clear an Unexpected Shutdown flag. The Unexpected Shutdown flag is recorded to, for example, the management information area 122 of the NAND memory 12. In a subsequent booting, a determination as to whether the first start up processing is executed or not is made on the basis of the Unexpected Shutdown flag. When the emergency evacuation is notified, new reception of all the commands other than re-booting is stopped. The emergency evacuation is notified from the power supply.

(1-3-8) Sleep Processing

The sleep processing is processing in which, after the executions of all the commands in the issuing waiting state and the access command being executed are terminated, all the dirty portion of the user data and the translation information in the write buffer 141 is stored to the emergency evacuation area 121. In a case where the above information has been successfully stored in the sleep processing, the control unit 15 clears an Unexpected Shutdown flag. In the sleep processing, in a case where the above information has been failed to be stored, the control unit 15 does not clear the Unexpected Shutdown flag. When the sleep is notified, a new reception of all the commands other than the recovery command is stopped. The sleep is notified from the host 2.

(1-3-9) Shut Down Processing

The shut down processing is processing for executing the cache flush processing after the execution of all the commands in the issuing waiting state is terminated. When the shut down is notified, a new reception of all the commands other than re-booting is stopped. The shut down is notified from the host 2. In a case where the flush has been successfully performed, the control unit 15 clears the Unexpected Shutdown flag. In a case where the flush has been failed, the control unit 15 does not clear the Unexpected Shutdown flag.

(1-4) Processing of Re-Booting Waiting

The processing of the re-booting waiting means the state after the emergency evacuation processing or the shut down processing is terminated. In the re-booting waiting processing, the control unit 15 receives only the re-booting command.

(2) Restoration Processing of Translation Information

The restoration processing of the translation information is processing for restoring the first table 201b. While the restoration processing of the translation information is executed, the control unit 15 does not receive the access command. A Signature response and a response to Identify are permitted. In the restoration processing of the translation information, the total number of times of rewriting in the system is substituted for the "time". The number of times of rewriting is the number of times of writing and erasing for each block. In the restoration processing of the translation information, the control unit 15 restores the latest record of the records of the first table 201b. The control unit 15 restores pieces of unit information which are recorded in the log storage area 124 and of which times are newer than the record of the corresponding first table 201a. In a case where the restoration processing of the translation information is executed in the first start up processing, subsequent processing is executed.

More specifically, the control unit 15 restores the corresponding record of the translation information about a block in which the user data 301 are stored and of which time is newer than the restored translation information. The control unit 15 restores the corresponding record of the translation information on the basis of the log information 231. The control unit 15 does not restore the corresponding record of the translation information about a block of which time is older than the restored translation information. The restored record is managed as dirty.

After the translation information is restored, the dirty portion of the translation information may be flushed, or may not be flushed. After the translation information is restored, whether the dirty portion of the translation information is flushed or not may be set from the outside.

(3) Power Supply Shut Off Processing

In the power supply shut off processing, there exist normal processing and PLP.

(3-1) Normal Processing

The normal processing includes flush of user data in the write buffer 141, flush of various kinds of dirty information, and flush of the statistics information 225. After the normal processing is terminated, the control unit 15 clears the Unexpected Shutdown flag.

(3-2) PLP

The PLP includes processing for storing user data and various kinds of dirty information in the write buffer 141 to the emergency evacuation area 121. After the PLP is terminated, the control unit 15 clears the Unexpected Shutdown flag, and sets a PLP flag. The PLP flag is a flag indicating that the memory system 1 is terminated by the PLP, and is, for example, recorded to the management information area 122. After the storing of the above information has been completed, the statistics information 225 is stored to the emergency evacuation area 121. In the PLP, holding of the statistics information 225 may not be guaranteed.

(4) Operation of Write Processing

The write processing means writing in accordance with a command from the host 2. The write processing includes four types which are write using a cache, FUA write, atomic write, and trim processing. Among the four types of write processing, the processing of the write using the cache is finished at an earliest point in time. The write using the cache is write processing that is terminated when the user data are stored to the write buffer 141. The FUA write is write processing that is terminated when the user data have been written to the NAND memory 12. While the FUA write is executed, the user data 301 written to the NAND memory 12 cannot be read out until the translation information has been updated. In a case where it is necessary to read the user data 301 before the translation information has been updated while the FUA write is executed, the control unit 15 reads the user data from the write buffer 141. The atomic write is writing for updating the translation information after all the user data which have been requested to be written by multiple write commands have been written. According to the atomic write, each of the user data cannot be read until all the user data which have been requested to be written by multiple write commands have been written. The trim processing is treated as one of the write processing.

A command appended to the write processing includes a cache flush command. The cache flush command is a command for causing the cache flush processing to be executed. In the cache flush processing, the control unit 15 writes the user data in the write buffer 141 to the NAND memory 12, and updates the translation information. The cache flush processing can be executed on the entire memory system 1. The memory system 1 may be configured so that the cache flush processing is executed while limiting a name space or a stream. In the memory system 1 that can execute the PLP, the memory system 1 may be configured to make a setting to disregard the cache flush command.

(4-1) Write Buffer Processing

The write buffer 141 is a buffer having a configuration of a double buffer and inputting and outputting data according to a rule of FIFO. The write buffer 141 includes a writing execution flag for each area of a predetermined size.

In a case of the write using the cache or the atomic write, the control unit 15 copies the user data in the write buffer 141 to the NAND memory 12 in units of pages in accordance with an accumulation of a predetermined amount to the write buffer 141. In the case of the FUA write, immediately after the user data are written to the write buffer 141, the control unit 15 copies the user data to the NAND memory 12 in units of pages. In the case of the trim processing, the control unit 15 writes the notification of the trim itself to the write buffer 141, and copies the notification of the trim from the write buffer 141 to the NAND memory 12 (the user data area 123 of the NAND memory 12). After the copy, the control unit 15 sets a writing execution flag in the area of the copy source. The control unit 15 can treat, as a vacant area, the area where the writing execution flag is set.

During the copy to the NAND memory 12, the write buffer processing does not have a management permission of the area of the copy source. More specifically, in the write buffer processing, the control unit 15 cannot write to the area of the copy source. In a case where, with regard to areas other than the area of the copy source, another user data is sent by designating the same logical address as the user data already stored in the write buffer 141 (re-writing), the control unit 15 overwrites the other user data to the user data already stored in the write buffer 141 in the write buffer processing.

In the write buffer processing, as long as there is a vacant area in the write buffer 141, the control unit 15 can store the user data sent from the host 2 to the write buffer 141 with any given timing. Except the case of re-writing, the control unit 15 updates the translation information in accordance with the storage of the user data to the write buffer 141. More specifically, the physical address of the storage location in the write buffer 141 is associated with the logical address indicating the location of the user data. The control unit 15 executes updating of the translation information on the RAM 14. In a case where the corresponding unit information does not exist in the cache area 143, the control unit 15 reads the corresponding unit information from the log storage area 124 to the cache area 143, and thereafter updates the unit information. After the unit information is updated, the control unit 15 sets, as dirty, the updated unit information and the unit information in the upper layer indicating the updated unit information.

The control unit 15 executes copy from the write buffer 141 to the NAND memory 12, when a cache flush command is received, when an FUA write is executed, when the target translation information in the FUA read is not-yet written state and there exist data in the write buffer 141, and when an idle time of a time equal to or more than a time set in advance is detected. In the case of the FUA write, for example, the control unit 15 copies only the user data written by the write command of the FUA write from the write buffer 141 to the NAND memory 12. In a case where there is a vacant area in a page of writing destination when the user data to be written to the NAND memory 12 are copied to the NAND memory 12, the control unit 15 may copy the user data to be written as well as user data which have not yet been set as the target to be written to the NAND memory 12.

(4-2) Processing for Selecting Block of Writing Destination

The control unit 15 selects, as the block of the writing destination, a free block of one or more free blocks in which the number of times of rewriting is the least. The free block means a block in which valid user data 301 are not stored. The free block is generated by garbage collection. The control unit 15 may randomly select, as candidates, a predetermined number free blocks from among two or more free blocks, and may select, as the block of the writing destination, a free block of the selected candidates in which the number of times of rewriting is the least. The free block is managed, for example, in a list format (free block list) so that the order of generation can be seen. The control unit 15 may select, as candidates, a predetermined number of free blocks generated at the oldest point in time or a predetermined number of free blocks generated at the latest point in time. The free block selected as the block of the writing destination is erased, and thereafter set as the writing destination. During the erasing, the control unit 15 allocates a unique sequence number in the memory system 1 to the block. The sequence number is a number indicating the order in which the erasing is executed. When information is written to the final page of a single block, the control unit 15 records a sequence number of the block.

(4-3) Writing to NAND Memory 12

When the user data are written from the write buffer 141 to the NAND memory 12, the control unit 15 locks the area of the copy source. In a case where there is a vacant area in the page of the copy destination, the control unit 15 reads data from the NAND memory 12, for example, in a manner of read modify write, and combines the read data with the user data to be written, and writes the combined data to the page of the copy destination. After the writing of the user data to the NAND memory 12 is terminated, the control unit 15 issues an update request of translation information (hereinafter simply referred to as an update request) in a case where the writing in question is the write using the cache or the processing associated with the FUA write. The update request includes a logical address, an address indicating the copy source in the write buffer 141, an old physical address, a new physical address, and the size of the data. With regard to the trim processing, the control unit 15 issues an update request including the logical address range to be invalidated, on the basis of the trim command.

(4-4) Atomic Write

In the atomic write, the control unit 15 writes the start and the end of the atomic write to the user data area 123. Two ways of operations can be considered as the operation of the atomic write.

(4-4-1) First Atomic Write

The control unit 15 queues the update request until the final writing of the atomic write is confirmed. After the final writing of the atomic write is confirmed, the control unit 15 issues a queued update request. During the update of the translation information in accordance with the atomic write, the control unit 15 stops reading of the logical address range which is the target of the atomic write. The size of the area capable of handling the atomic write is determined by the margin capacity of the memory system 1 and the amount of the update requests that can be queued. According to the first atomic write, nesting can be made.

(4-4-2) Second Atomic Write

The control unit 15 issues an update request. The control unit 15 copies, in the cache area 143, the unit information for which an update request is given. The control unit 15 updates the copy of the unit information while the atomic write is executed. After the final writing of the atomic write is confirmed, the control unit 15 causes a copy of the unit information to be reflected in the unit information of the copy source. In read-out operation or writing operation other than the atomic write, the control unit 15 uses the unit information about the copy source. The reflection is executed as follows. More specifically, the control unit 15 overwrites the non-dirty portion of the copy of the unit information from the unit information of the copy source to the copy of the unit information. Then, as illustrated in the copy of the unit information, the control unit 15 updates the table address recorded in the translation information of the higher level. The size of the area in which the second atomic write can be performed is determined by the amount of copy of the unit information that can be stored in the cache area 143 and the margin capacity of the memory system 1. According to the second atomic write, the update of the translation information can be completed in a shorter time as compared with the first atomic write in which multiple update requests need to be executed successively. More specifically, the period in which the read-out is stopped can be reduced. In a case where multiple atomic writes are executed, the control unit 15 generates the copy of the unit information for each atomic write.

(4-5) Update Processing of Translation Information

When the control unit 15 receives an update request, the timing of the update of the translation information is checked. The control unit 15 queues the update request until the timing at which the translation information can be updated is attained. The control unit 15 may, for example, queue the update request for each stream. After the update of the translation information, the control unit 15 releases the write buffer 141.

(4-6) Trim Processing

In the trim processing, the control unit 15 records the received trim command to the user data area 123. The minimum unit written to the user data area 123 can accommodate multiple trim commands. After recording the trim command, the control unit 15 updates the translation information, and updates the corresponding valid information. In a case where all the records of the unit information are invalidated, the control unit 15 invalidates the record of the translation information in the higher level indicating the unit information in which all the records are invalidated.

(5) Garbage Collection

The garbage collection is processing for copying valid user data 301 included in a single block to another block, and thereafter, invalidating all the user data 301 stored in the single block. A block in which all the user data 301 stored inside are invalidated by the garbage collection is managed as a free block.

(5-1) Selection of Block to be Subjected to Garbage Collection

The control unit 15 selects a block, which is to be subjected to the garbage collection, from one or more blocks storing valid user data 301. A bock, which is to be subjected to the garbage collection, is referred to as a GC block. The method for selecting the GC block affects the delay time and the write amplification. The control unit 15 selects a GC block according to, for example, the following method.

For example, the control unit 15 selects, as a GC block, a block storing the largest number of invalid user data 301. According to this selection method, the write amplification can be reduced. The control unit 15 may be configured to select a GC block according to this selection method when free blocks are almost run out of.

For example, the control unit 15 selects a GC block from among the blocks in which the number of stored invalid user data 301 is more than a predetermined threshold value. The control unit 15 may be configured to select a GC block in accordance with this selection method when free blocks are almost run out of. The control unit 15 may change the threshold value in accordance with the number of free blocks.

For example, the control unit 15 classifies blocks into a block of which elapsed time since rewriting is large and a block of which elapsed time since rewriting is small, and the control unit 15 selects, as a GC block, a block storing the invalid user data 301 from among the blocks of which elapsed time since rewriting is large. The control unit 15 may be configured to select a GC block in accordance with this selection method during the idle time.

(5-2) Determination of GC Ratio

The control unit 15 selects the GC block, and thereafter updates the GC ratio. The GC ratio is a setting value of a ratio of the amount of copy due to the garbage collection with respect to the amount of writing of the user data to the NAND memory 12. The control unit 15 sets, as the GC ratio, a numerical value obtained by dividing the number of valid user data 301 in the block by the number of invalid user data 301 in the block. Hereinafter, the control unit 15 updates, as necessary, the GC ratio in accordance with the progress in the writing of the user data to the NAND memory 12 and the copy due to the garbage collection.

(5-3) Ensuring of Block of Copy Destination

The control unit 15 selects, as a block of the copy destination, a block of the free blocks of which number of times of rewriting is as small as possible. For example, the control unit 15 may randomly select, as a candidate, a predetermined number of free blocks from two or more free blocks, and select, as a block of the copy destination, a free block of the selected candidates of which number of times of rewriting is the least. The free block is managed, for example, in a list format in such a manner that the order of generation can be seen. The control unit 15 may select, as a candidate, a predetermined number of free blocks generated at the oldest point in time or a predetermined number of free blocks generated at the latest point in time. The control unit 15 allocates a sequence number to the selected block of the copy destination.

(5-4) Copy of Valid User Data 301

The control unit 15 identifies the valid user data 301 on the basis of the valid information. The control unit 15 generates a copy command for copying the identified valid user data 301 to the block of the copy destination. The copy command includes the logical address and the physical address indicating the location of the user data 301 of the copy source. Before the copy command is executed, the control unit 15 calculates the physical address indicating the location of the copy destination. The control unit 15 calculates the physical address indicating the location of the copy destination so that the user data are stored in order from the head of the block of the copy destination by means of copying. The control unit 15 adjusts the execution timing of the copy command on the basis of the GC ratio. The control unit 15 preferentially executes a copy command rather than generation of a copy command. After copying, the control unit 15 updates the GC ratio. The control unit 15 calculates a new GC ratio by dividing a value obtained by subtracting the number of copied user data 301 from the number of original valid user data 301 by a value obtained by subtracting the number of written user data from the number of the original invalid user data 301.

(5-5) Update of Translation Information and Valid Information

After copying, the control unit 15 updates the translation information and the valid information. For example, after the control unit 15 completes copying of all the valid user data 301 stored in the GC block, the control unit 15 starts updating the translation information and the valid information. The degree of priority of the execution of the translation information and the valid information due to the garbage collection is configured to be lower than the degree of priority of the execution of the processing for accessing the NAND memory 12.

For example, after the copying, first, the control unit 15 updates the valid information with regard to the block of the copy destination. More specifically, the control unit 15 updates the valid information in such a manner that all the user data 301 copied to the block of the copy destination are assumed to be valid. Subsequently, the control unit 15 confirms whether the translation information indicates the location of the copy source of the user data 301. This is because, before the copying is completed, the translation information may be updated due to writing of the user data caused by a write command. In a case where the translation information indicates the location of the copy source of the user data 301, the control unit 15 updates the translation information so that the location of the copy source of the user data 301 indicates the location of the copy destination. In a case where the state of the unit information transits from the non-dirty state to the dirty state because of the updating of the translation information, the control unit 15 updates the GC dirty information 223. In a case where the translation information does not indicate the location of the copy source of the user data 301, the control unit 15 does not update the translation information, and updates the valid information with regard to the block of the copy destination in such a manner that the corresponding user data 301 are assumed to be invalid. The control unit 15 updates the translation information and the valid information about all the copied user data 301, and thereafter, updates the valid information of the block of the copy source in such a manner that all the user data 301 are invalid.

The control unit 15 monitors the valid information. In a case where there is a block in which all the user data 301 are recorded as invalid, the control unit 15 manages the block as a free block. More specifically, the control unit 15 adds, to the free block list, a block in which all the user data 301 are recorded as invalid. The location where the block is added may not be the end of the free block list. For example, the control unit 15 compares the number of times of rewriting between the block recorded at the end of the free block list and the block to be added. In a case where the number of times of rewriting in the block recorded at the end of the free block list is more than the number of times of rewriting in the block to be added, the control unit 15 adds the block, which is to be added, to a location before the block recorded at the end of the free block list. In a case where the number of times of rewriting in the block recorded at the end of the free block list is less than the number of times of rewriting in the block to be added, the control unit 15 adds the block, which is to be added, to a location after the block recorded at the end of the free block list. The reason why complete sorting based on the number of times of rewriting is not performed is because the lifetime of the NAND memory 12 is extended by extending the execution interval of erasing.

(6) Read Processing

The read processing includes the read using the cache and the FUA read. The type of read can be designated by the read command. The FUA read is read-out in which, in a case where the logical address of the range designated by the read command remains in the cache, it is flushed, and thereafter, an invalidating request of the page buffer cache of the NAND memory 12 is issued, and thereafter, the read using the cache is executed. In a case where there exist data in the write buffer 141 during flushing, the control unit 15 executes flushing of the write buffer 141. The read using the cache includes translation of the logical address in the range designated by the write command, transmission of a read-out request to the NAND controller 13, storing of the user data 301 sent from the NAND controller 13 into the read buffer 142, transmission of the user data 301 stored in the read buffer 142 to the host.

(6-1) Read Cache

There are two types of read caches, which include a page buffer cache and a read buffer 142. The page buffer cache is provided inside of the chip constituting the NAND memory 12. When the NAND controller 13 continuously reads the user data 301 from the same physical address, a read command is not transmitted to the NAND memory 12, and instead, the user data 301 stored in the page buffer cache are read out. The data are input and output to and from the read buffer 142 in accordance with the rule of the FIFO.

(7) Replacement of Cache Line in Cache Area 143

(7-1) First Replacement

In a case where the control unit 15 leaves a cache line during the write processing or the read processing, a cache line that becomes dirty due to the garbage collection is preferentially left. More specifically, first, the control unit 15 refers to the GC dirty information 223. Then, the control unit 15 writes the oldest unit information of the unit information indicated by the GC dirty information 223 back to the log storage area 124, and deletes the oldest unit information from the cache area 143. In a case where there does not exist any unit information that has become dirty due to the garbage collection, the control unit 15 randomly selects the unit information cached in the cache area 143. The control unit 15 generates a random number and selects unit information by using the generated random number. The control unit 15 determines whether the selected unit information is dirty or not by referring to the user dirty information 222. In a case where the selected unit information is determined not to be dirty, the control unit 15 deletes the selected unit information from the cache area 143. In a case where the selected unit information is determined to be dirty, the control unit 15 writes the oldest unit information of the unit information indicated by the user dirty information 222 back to the log storage area 124, and deletes the oldest unit information from the cache area 143.

(7-2) Second Replacement

In a case where a cache line is left in order to perform the garbage collection, the control unit 15 replaces the cache line as follows. More specifically, the control unit 15 sets the upper limit value to the number of pieces of unit information indicated by the GC dirty information 223. In a case where the number of pieces of unit information indicated by the GC dirty information 223 is determined to have attained the upper limit value, the control unit 15 writes the oldest unit information of the unit information indicated by the GC dirty information 223 back to the log storage area 124, and deletes the oldest unit information from the cache area 143. In a case where the number of pieces of unit information indicated by the GC dirty information 223 is determined not to have attained the upper limit value, the control unit 15 randomly selects the unit information cached in the cache area 143. In a case where the selected unit information is determined not to be dirty, the control unit 15 deletes the selected unit information from the cache area 143. In a case where the selected unit information is determined to be dirty, the control unit 15 writes the oldest unit information of the unit information indicated by the user dirty information 222 back to the log storage area 124, and deletes the oldest unit information from the cache area 143.

As described above, in the first embodiment, the translation information is managed by being separated out into multiple levels in the hierarchy. Then, the size of the second table 202a which is the translation information which belongs to the second level in the hierarchy is the same as the size of the third table 203a which is the translation information which belongs to the second level in the hierarchy. Therefore, the sizes of the tables 202a, 203a can be managed easily. The second table 202a and the third table 203a can be stored in a mixed manner in the log storage area 124. More specifically, it is not necessary to do management separately for the area storing the second table 202a and the area storing the third table 203a. In addition, the second table 202a and the third table 203a can be mixed in a single page to be stored. The number of tables that can be stored in each page can be maintained at a certain number. As described above, according to the first embodiment, the management of the translation information becomes easy, and therefore, the cost of the management of the translation information becomes low, and the memory system 1 becomes more convenient.

In the above explanation, the size of the second table 202a which is the translation information which belongs to the second level in the hierarchy is the same as the size of the third table 203a which is the translation information which belongs to the third level in the hierarchy. The translation information may be separated out into four or more levels in the hierarchy, and the sizes of the pieces of translation information which belong to any given two levels in the hierarchy may be configured to be the same as each other. For example, in a case where the size of the translation information which belongs to the i-th level in the hierarchy and the size of the translation information which belongs to the j-th level in the hierarchy are configured to be the same as each other, the translation information which belongs the i-th level in the hierarchy and the translation information which belongs to the j-th level in the hierarchy may be stored in a mixed manner in the same area.

The size of each valid bit map 212a is the same as the size of the second table 202a and the third table 203a. Therefore, the valid bit map 212a, the second table 202a, and the third table 203a can be stored in a mixed manner in the log storage area 124. The valid bit map 212a, the second table 202a, and the third table 203a can be stored in a mixed manner in a single page. The number of pieces of unit information that can be stored in each page can be maintained at a certain number.

Second Embodiment

The second embodiment can be applied to the memory system 1 according to the first embodiment. According to the second embodiment, a control unit 15 is configured to include two or more processors.

Figure 9:
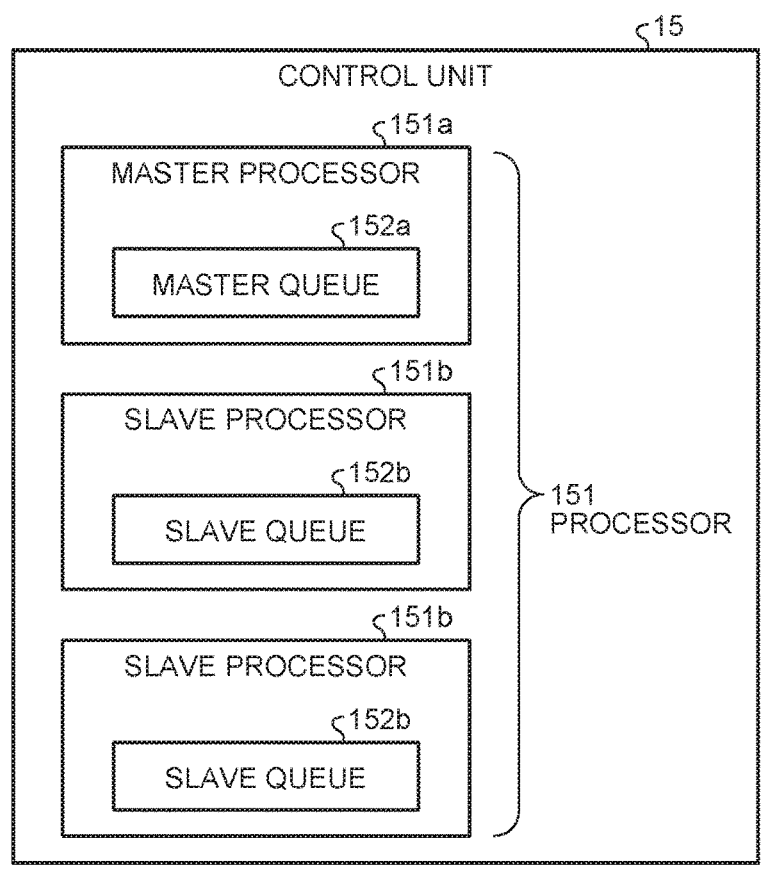
FIG. 9 is a figure illustrating a configuration of a control unit according to a second embodiment.

FIG. 9 is a figure illustrating a configuration of the control unit 15 according to the second embodiment. According to the example of this drawing, the control unit 15 includes multiple processors 151 (three processors 151 in this case). One of the three processors 151 functions as a dynamic task scheduler that dynamically distributes the task to the other two processors 151. The processor 151 serving as the dynamic task scheduler will be referred to as a master processor 151a. Two processors 151 to which the tasks are distributed by the master processor 151a will be referred to as slave processors 151b. It should be noted that the task constitutes the control of the memory system 1. The control of the memory system 1 is constituted by multiple tasks. A single processing may be constituted by a single task. A single processing may be constituted by multiple tasks. Multiple processing may be constituted by a single task.

Figure 10:
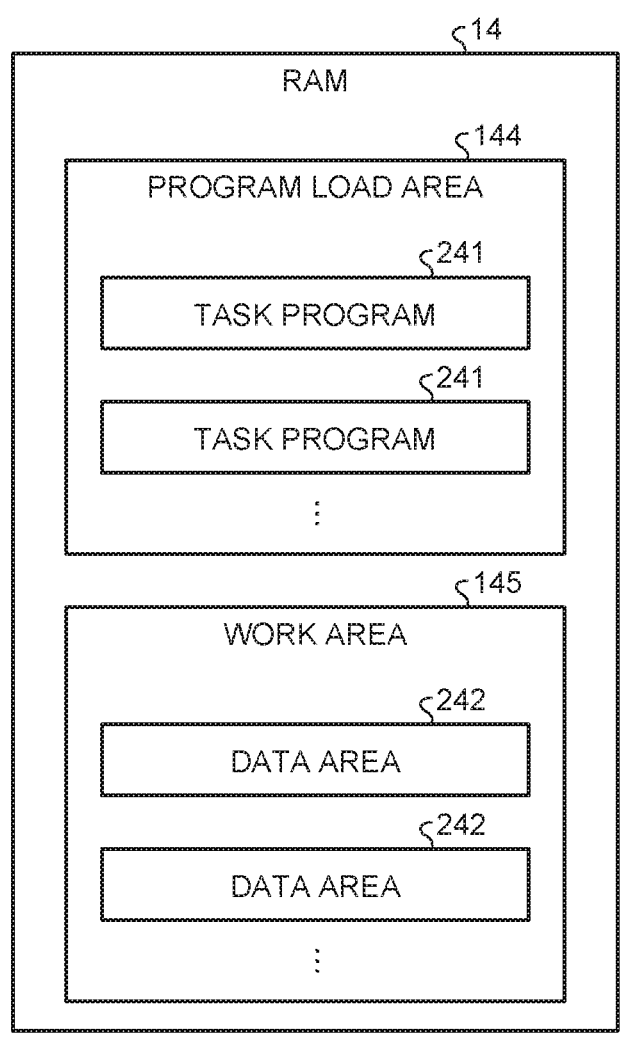
FIG. 10 is a figure illustrating a configuration of a RAM according to the second embodiment.

FIG. 10 is a figure illustrating a configuration of a RAM 14 according to the second embodiment. The configuration explained in FIG. 3 is omitted here. According to the second embodiment, the RAM 14 includes a program load area 144 and a work area 145. One or more task programs 241 are loaded to the program load area 144. The task program 241 is a set of program codes for achieving a single task.

A single task program 241 may be executed at a time by multiple processors 151. The work area 145 includes a data area 242 that are allocated and released on every execution. In each data area 242, a value or values used to execute a task are stored.

For example, the task of updating the translation information is achieved by a single task program 241. For a single task program 241 for updating the translation information, a different data area 242 is allocated for each update request. Each data area 242 stores, as values used for execution of the task, a logical address, an old physical address, a new physical address, and the like included in an update request. A single task program 241 for a task for updating translation information is executed simultaneously by multiple processors 151, and multiple processors 151 simultaneously executing the single task program 241 for the task for updating the translation information are configured to use data areas 242 different from each other. Therefore, the control unit 15 can process multiple update requests, which are different from each other, in parallel.

For example, a task for analyzing a command is realized by a single task program 241. For a single task program 241 for analyzing a command, a data area 242 different for each command is allocated. Each data area 242 stores, as values used for execution of the task, identification information about the command and parameters included in the command. A single task program 241 for a task for analyzing a command is executed simultaneously by multiple processors 151, and multiple processors 151 simultaneously executing the single task program 241 for the task for analyzing the command are configured to use data areas 242 different from each other. Therefore, the control unit 15 can process multiple update requests, which are different from each other, in parallel.

The memory system 1 is configured so that multiple data areas 242 can be allocated on every execution for a single task program 241, and therefore, it is not necessary to load the task program 241 to the program load area 144 on every execution. In the start up processing, the control unit 15 loads all the task programs 241 to the program load area 144. The control unit 15 can execute exchange of data between multiple tasks by using the data area 242.

The master processor 151a includes a master queue 152a. Each slave processor 151b includes a slave queue 152b. A task of execution waiting is registered to the master queue 152a. More specifically, in the master queue 152a, identification information indicating the task program 241 achieving the task of the execution waiting registered in association with information for designating the data area 242 used to execute the task. The master processor 151a distributes one or more tasks registered in the master queue 152a into two slave processors 151b. The master processor 151a registers the task registered to the master queue 152a to the slave queue 152b provided in any one of the slave processors 151b. Each slave processor 151b executes the task registered in the slave queue 152b provided in the slave processor 151b. In other words, each slave processor 151b executes the task program 241 indicated by the identification information registered in the slave queue 152b provided in the slave processor 151b while using the data area 242 designated by the information associated with the identification information.

The method for distributing the task is designed in any manner. For example, the upper limit value is set in the number of tasks that can be registered in each slave queue 152b. The master processor 151a registers the task to each slave queue 152b until the upper limit value is attained. Every time each slave processor 151b completes execution of the task registered to the slave queue 152b provided in the slave processor 151b, the slave processor 151b transmits a completion notification to the master processor 151a. The master processor 151a having received the completion notification registers a new task to the slave queue 152b provided in the slave processor 151b that transmitted the completion notification.

It should be noted that a single task may generate another task. The other task is registered to the master queue 152a, and thereafter distributed to any given slave queue 152b. A single task may be configured to designate the slave processor 151b executing another task. In this case, the other task may not be registered by way of the master queue 152a, and instead, the other task may be directly registered to the slave queue 152b provided in the designated slave processor 151b. In a case where a slave processor 151b executing another task is designated, the another task may be registered to the slave queue 152b provided in the designated slave processor 151b regardless of whether the number of tasks registered in the slave queue 152b provided in the designated slave processor 151b attains the upper limit value.

As described above, the master processor 151a can dynamically distribute the task to multiple slave processors 151b.

The power supply may be configured to be individually provided to or stopped for each of the multiple slave processors 151*b*. For example, the memory system 1 is configured to be able to operate in two modes which include a normal mode and a low electric power consumption mode of which electric power consumption is lower than that of the normal mode. In the normal mode, the power supply control unit provides power supply to the two slave processors 151*b*. The power supply control unit provides power supply to only one of the two slave processors 151*b*. The power supply control unit is constituted by either hardware, software, or a combination of them both. For example, the master processor 151*a* functions as a power supply control unit. The master processor 151*a* distributes the task to the two slave processors 151*b* in the normal mode. In the low electric power consumption mode, the master processor 151*a* provides the task to only the slave processor 151*b* of the two slave processors 151*b* to which the power supply is provided. As described above, the master processor 151*a* dynamically determines the registration destination of the task, and therefore, the control unit 15 can continue the control of the memory system 1 even when there is a change in the number of slave processors 151*b* to which the power supply is provided.

It should be noted that the master processor 151*a* may be provided with a slave queue 152*b* in addition to the master queue 152*a*. The master processor 151*a* may distribute the task to the slave queue 152*b* provided in the master processor 151*a*.

In the second embodiment, in order to maintain consistency of the translation information and the valid information, the task for updating the translation information and the task for updating the valid information are executed by the slave processor 151*b* determined in advance.

For example, in a case of the translation information, the logical address space of the memory system 1 is divided into two logical address ranges. The task for registering the task for updating the translation information is executed by any given processor 151. In the task for registering the task for updating the translation information, the update request of the logical address included in the first logical address range of the two logical address ranges is caused to be executed by a slave processor 151*b* determined in advance of the two slave processors 151*b*. In the task for registering the task for updating the translation information, the update request of the logical address included in the second logical address range of the two logical address ranges is caused to be executed by another slave processor 151*b* of the two slave processors 151*b*. In a case where multiple tasks for updating the translation information are registered in a single slave queue 152*b*, the slave processor 151*b* having the slave queue 152*b* is assumed to execute each task for updating the translation information in the order registered in the slave queue 152*b*. As described above, the logical address range in charge for the update of the translation information is set in advance for each slave processor 151*b*, so that the consistency of the translation information is maintained.

For example, in a case of valid information, the physical address space of the memory system 1 is divided into two partial spaces. The task for registering the task for updating the valid information is executed by any given processor 151. In the task for registering the task for updating the valid information, the update request of the logical address included in the first physical address range of the two physical address ranges is caused to be executed by a slave processor 151*b* determined in advance of the two slave processors 151*b*. In the task for registering the task for updating the valid information, the update request of the logical address included in the second physical address range of the two physical address ranges is caused to be executed by another slave processor 151*b* of the two slave processors 151*b*. In a case where multiple tasks for updating the valid information are registered in a single slave queue 152*b*, the slave processor 151*b* having the slave queue 152*b* is assumed to execute each task for updating the valid information in the order registered in the slave queue 152*b*. As described above, the physical address range in charge for the update of the valid information is set in advance for each slave processor 151*b*, so that the consistency of the valid information is maintained.

For example, in the garbage collection, a task for registering the task for generating a copy command is executed. In the task for registering the task for generating the copy command, the physical address range of the GC block is divided into two physical address ranges. In the task for registering the task for generating the copy command, the valid bit map 212*b* in the first physical address range of the two physical address ranges is given to a slave processor 151*b* determined in advance of the two slave processors 151*b*, and the task for generating the copy command is registered to the one slave processor 151*b*. When the one slave processor 151*b* generates a copy command on the basis of the registered task, the valid user data 301 to be copied is identified on the basis of the valid bit map 212*b* of the first physical address range. In the task for registering the task for generating the copy command, the valid bit map 212*b* in the second physical address range of the two physical address ranges is given to another slave processor 151*b* of the two slave processors 151*b*, and the task for generating the copy command is registered to the other slave processor 151*b*. When the other slave processor 151*b* generates a copy command on the basis of the registered task, the valid user data 301 to be copied is identified on the basis of the valid bit map 212*b* of the second physical address range.

As described above, in the second embodiment, the memory system 1 includes multiple processors 151. In each processor 151, the range of the logical address is set individually. Each processor 151 executes updating of the record in the translation information with regard to the logical address included in the range of the logical address that is set by the processor 151. Therefore, the updating of the translation information can be executed by multiple processors 151 in parallel, and therefore, the translation information can be updated at a higher speed than the case where the updating of the translation information is executed by a single processor 151. The translation information can be updated at a higher speed without losing the consistency of the translation information.

In each processor 151, the range of the physical address is set individually. Each processor 151 executes updating of the record of the valid information in the range of the physical address that is set in the processor 151. Therefore, the updating of the valid information can be executed by multiple processors 151 in parallel, and therefore, the valid information can be updated at a higher speed than the case where the updating of the valid information is executed by a single processor 151. The valid information can be updated at a higher speed without losing the consistency of the valid information.

During the garbage collection, a single processor 151 distributes the processing for generating the copy command to multiple processors 151. More specifically, a single processor 151 divides the GC block into multiple areas. Each processor 151 identifies the valid user data 301 stored in one of the divided areas, and generates a copy command for copying the identified valid user data 301. Therefore, even when there are many valid user data 301 stored in the GC block, the copy commands can be generated at a high speed.

Third Embodiment

The third embodiment can be applied to any memory system 1 of the first embodiment and the second embodiment. According to the third embodiment, memory system 1 includes a software defined platform. In the software defined platform, for example, the function of the memory system 1 is separated from the control of the hardware, and the control is executed by software.

According to the third embodiment, the control unit 15 includes multiple processors 151 (three processors 151 in this case) like the second embodiment. The three processors 151 include a master processor 151a and two slave processors 151b.

In the configuration of the memory system 1, a host interface unit 11, a NAND controller 13, a RAM 14, and the three processors 151 are included in the hardware.

Figure 11:
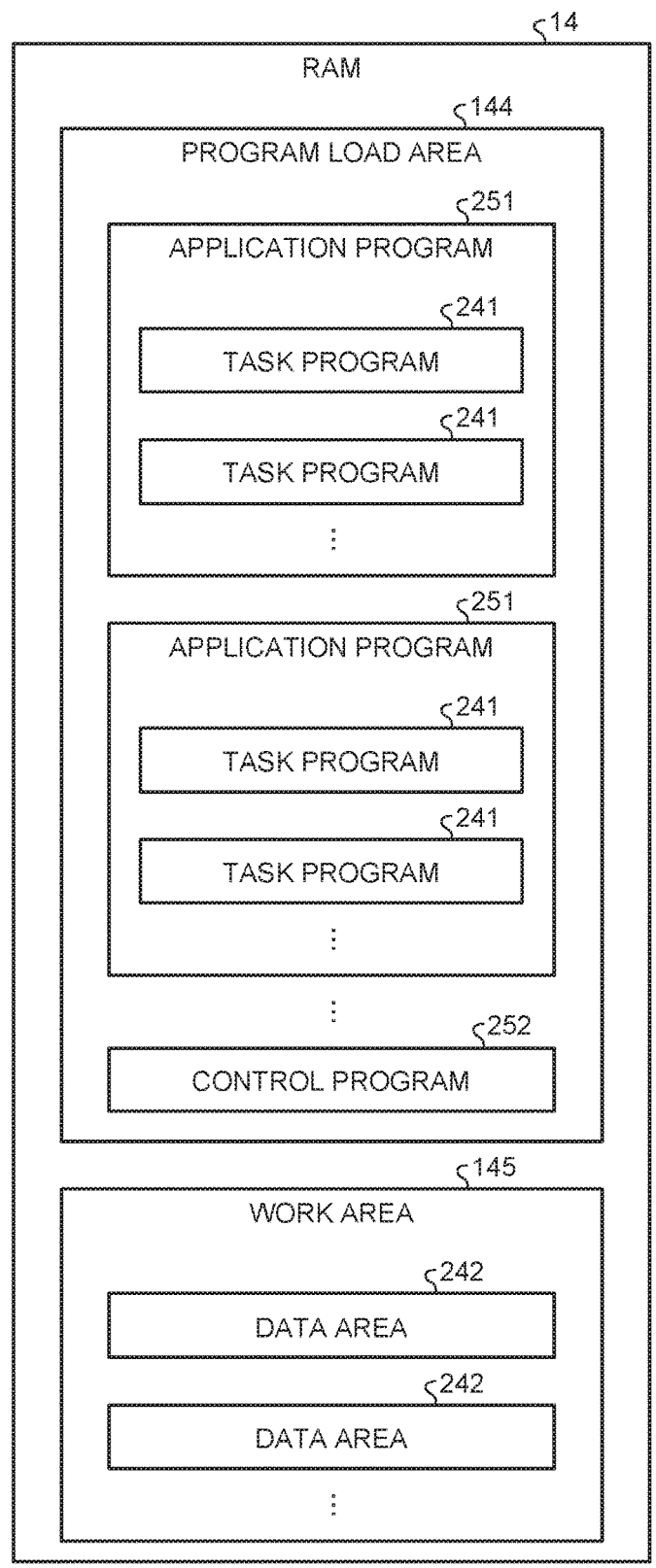
FIG. 11 is a figure illustrating a configuration of a RAM according to a third embodiment.

FIG. 11 is a figure illustrating a configuration of the RAM 14 according to the third embodiment. The configuration explained in FIG. 3 is omitted here. According to the third embodiment, the RAM 14 includes a program load area 144 and a work area 145. Two or more application programs 251 and the control program 252 are loaded to the program load area 144. Each application program 251 is constituted by one or more task programs 241. The work area 145 includes data area 242 that are allocated and release on every execution.

The software defined platform according to the third embodiment includes a control program 252, hardware, and a NAND memory 12. By using the software defined-type SSD platform, the software can be controlled by separating the function of the SSD from the control of the hardware. In the third embodiment, the platform means the aggregate of hardware, operating system (OS), middleware, a combination thereof, settings, environment, and the like serving as the basis required to operate the hardware or the software.

Each processor 151 executes the control program 252. The master processor 151a includes a master queue 152a. The slave processor 151b includes a slave queue 152b.

The control program 252 is a common module for absorbing the difference in the hardware. More specifically, the control program 252 realizes basic operation between each application program 251 and the hardware so that each application program 251 is not dependent upon the hardware. "Not dependent" means that, even if at least the other of cooperating software and hardware is replaced, "not dependent" means the property of continuous usability. For this reason, the control program 252 is in accordance with an API (Application Program Interface).

For example, the control program 252 receives a command issued in accordance with a particular interface by the application program 251, and executes control on the hardware and the NAND memory 12 on the basis of the command. The control program 252 performs scheduling of tasks. The master processor 151a monitors the states of the two slave queues 152b, and distributes the task registered to the master queue 152a to the two slave queues 152b. Each slave processor 151b executes the task registered in each of the slave queues 152b.

The storage location of the control program 252 and the storage location of each application program 251 in the RAM 14 are determined during booting of the memory system 1, and thereafter, the storage location of the control program 252 and the storage location of each application program 251 in the RAM 14 are not relocated during booting.

Each application program 251 is, for example, various kinds of software such as firmware. Each application program 251 may be configured to include software other than the firmware.

In the third embodiment, each application program 251 can achieve the function of the SSD by itself. Each of two or more application programs 251 includes the task program 241 achieving the task for analyzing the command, the task program 241 for realizing the task for updating the translation information, the task program 241 for realizing the task for updating the valid information, and the like, and therefore, the function of the SSD can be realized by using any one of the two or more application programs 251.

The task program 241 for realizing the same type of task may be different for each application program 251. For example, the task program 241 for realizing the read processing included in the first application program 251 can be associated with the location designation using the LBA, and the task program 241 for realizing the read processing included in the second application program 251 can be associated with the location designation using KVS (Key-Value Store). For example, the task program 241 for realizing the management of the translation information included in the first application program 251 and the task program 241 for realizing the management of the translation information included in the second application program 251 are different in the management unit of the translation information. For example, the access from the processor 151 to the RAM 14 is encrypted. For example, an encryption key with which the processor 151 accesses the RAM 14 under the control of the first application program 251 is different from an encryption key with which the processor 151 accesses the RAM 14 under the control of the second application program 251. It should be noted that the encryption key is different for each of the application programs 251. The encryption key may be different for each of the task programs 241.

For example, the control program 252 is generated by the manufacturer of the memory system 1, and initially stored to the memory system 1. Each application program 251 may not be initially stored to the memory system 1. Some or all of two or more application programs 251 may be generated or stored by a person other than the manufacturer such as a client, a purchaser of the memory system 1, a software developer, or the like.

The host 2 can select an application program 251 to be used from among two or more application programs 251.

For example, in a case where NVMe is employed as the interface standard of communication between the memory system 1 and the host 2, the host 2 designates an application program 251 to be used from among two or more application programs 251 when the host 2 generates a name space in the memory system 1. The control unit 15 stores a relation between the host 2 and the name space, and when the control unit 15 receives a command from the host 2, the control unit 15 identifies the corresponding application program 251 in accordance with the host 2 of the transmission source of the command or the name space of the access destination.

As described, according to the third embodiment, the memory system 1 loads multiple application programs 251 to the RAM 14. The memory system 1 is configured to be able to select an application program 251 to be used from among multiple application programs 251. Therefore, for example, in a case where multiple hosts 2 are connected to the memory system 1, the memory system 1 can perform a different operation for each of the hosts 2.

The memory system 1 is configured to be able to select an application program 251 when a name space is generated. Therefore, the memory system 1 can perform a different operation for each of the name spaces.

Fourth Embodiment

The fourth embodiment can be applied to any memory system 1 of the first to the third embodiments. According to the fourth embodiment, the memory system 1 is configured to be able to establish multiple logical address spaces independent from each other. Each of multiple logical address spaces independent from each other is, for example, a name space.

The control unit 15 adds a new name space in accordance with a generation request from the host 2. The control unit 15 deletes an existing name space in accordance with a deletion request from the host 2. The control unit 15 can add a new name space until the total size of all the name spaces attains the user capacity of the memory system 1.

Figure 12:
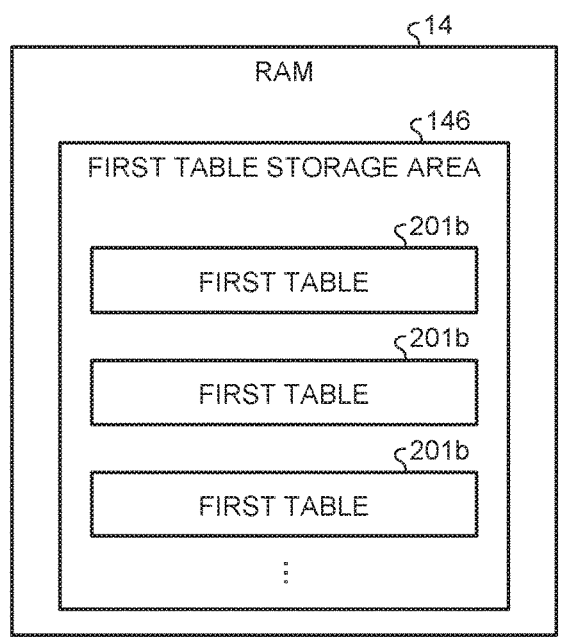
FIG. 12 is a figure illustrating a configuration of a RAM according to a fourth embodiment.

FIG. 12 is a figure illustrating a configuration of the RAM 14 according to the fourth embodiment. According to the fourth embodiment, the first table storage area 146 is allocated in the RAM 14. The control unit 15 manages the first table 201b for each name space. The first table storage area 146 stores the first table 201b for each name space.

The control unit 15 generates a new first table 201b in accordance with a generation request from the host 2. The control unit 15 deletes the first table 201b corresponding to the name space designated by the deletion request in accordance with a deletion request from the host 2. Like the case of the trim, the deletion of the name space involves updating of the valid information. The control unit 15 stores the first tables 201b in a continuous area. The control unit 15 manages the storage location of each of the first tables 201b in association with the name space.

The management unit of each of the first tables 201b may be the same between the name spaces or may be different for each of the name spaces. In this case, for example, the management unit of each of the first tables 201b is assumed to be the same between the name spaces. The size of the first table storage area 146 is a size at least twice as large as the total size of all the first tables 201b in a case where the total size of all the name spaces attains the upper limit.

Figure 13:
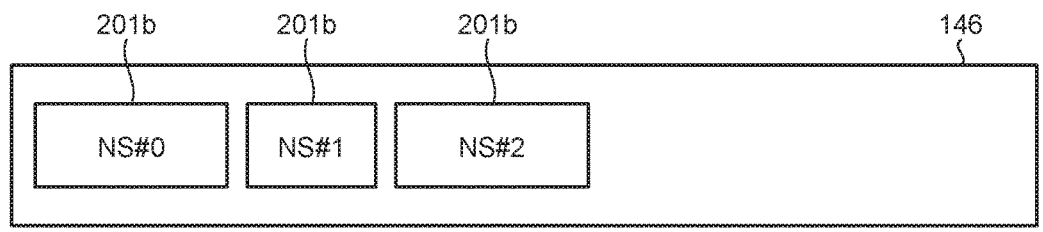
FIG. 13 is a figure explaining a change of a state of storage of each of the first tables.

FIGS. 13 to 19 are figures for explaining the change in the state of the storage of each of the first tables 201b. In a case where the memory system 1 includes three name spaces (NS#0, NS#1, and NS#2), for example, as illustrated in FIG. 13, the first tables 201b are arranged in order from the head of the first table storage area 146. Each of the first tables 201b is arranged without leaving a space between the first tables 201b.

Figure 14:
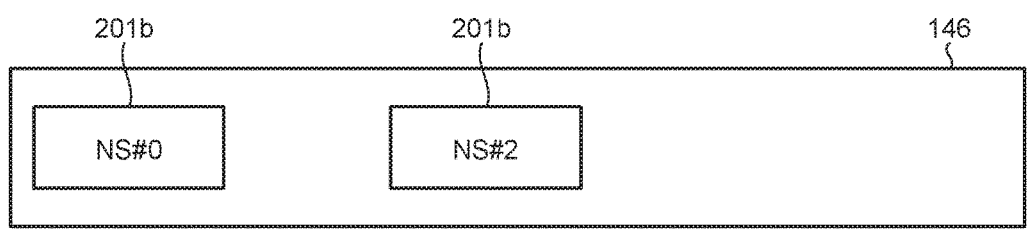
FIG. 14 is a figure explaining a change of a state of storage of each of the first tables.

In a case where the control unit 15 receives a deletion request of NS#1 in the state of FIG. 13, the first table 201b of NS#1 is deleted as illustrated in FIG. 14. It should be noted that the control unit 15 updates the valid information before the first table 201b of NS#1 is deleted. More specifically, the control unit 15 invalidates all the user data 301 written by designating NS#1. Before the first table 201b of NS#1 is deleted, the control unit 15 invalidates all the translation information of NS#1 which belongs to the lower level in the hierarchy.

Figure 15:
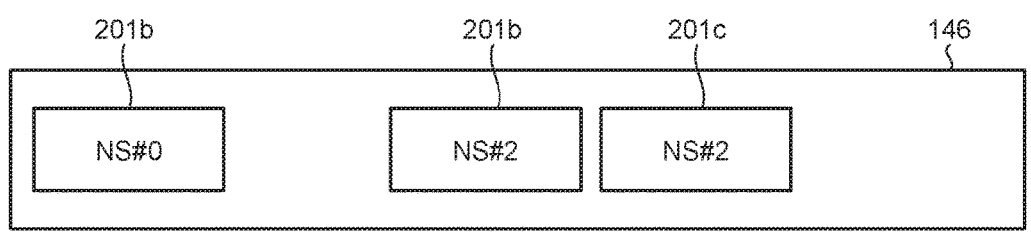
FIG. 15 is a figure explaining a change of a state of storage of each of the first tables.

Subsequently, the control unit 15 performs a work for eliminating the space generated by the deletion of the first table 201b. For example, in the state of FIG. 14, the control unit 15 relocates the first table 201b of NS#2. The relocation is executed as follows. As illustrated in FIG. 15, the control unit 15 copies the first table 201b of NS#2, which is the first table 201b to be relocated, to the vacant area of the first table storage area 146. The copied first table 201b will be referred to as a first table 201c. The first table storage area 146 has a size twice or more as large as the maximum value of the total size of each of the first tables 201b, and therefore, in the first table storage area 146, the first table 201b can be copied regardless of the magnitude of the size of the first table 201b. The first tables 201b are arranged without any space from the head of the first table storage area 146, and therefore, the area from the center to the end of the first table storage area 146 can be used as an area for storing the copy of the first table 201b.

Figure 16:
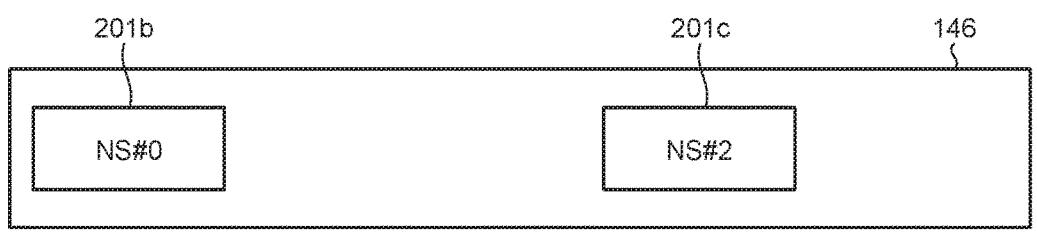
FIG. 16 is a figure explaining a change of a state of storage of each of the first tables.
Figure 17:
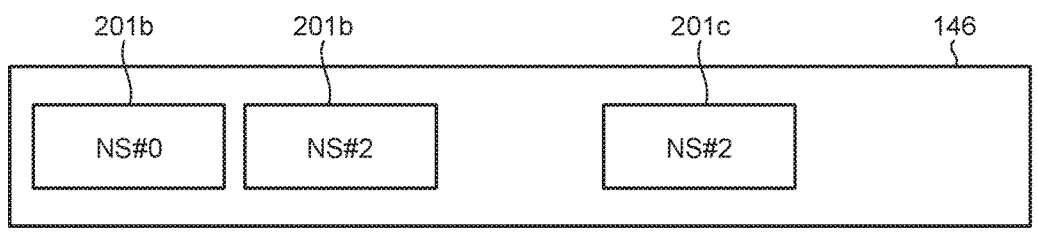
FIG. 17 is a figure explaining a change of a state of storage of each of the first tables.

Subsequently, as illustrated in FIG. 16, the control unit 15 deletes the first table 201b of NS#2 from the first table storage area 146. Then, as illustrated in FIG. 17, the control unit 15 copies the first table 201c of NS#2 to the location which is continuously to the end of the first table 201b of NS#0 as the first table 201b of NS#2. Then, as illustrated in FIG. 18, the control unit 15 deletes the first table 201c of NS#2 from the first table storage area 146, and completes the relocation of the first table 201b of NS#2.

In a case where there are multiple first tables 201b which are to be relocated in order to eliminate the space caused by the deletion of the first table 201b, the control unit 15 successively relocates each of the multiple first tables 201b. The control unit 15 relocates the multiple first tables 201b, which are to be relocated, in order from the first table 201b closest to the space.

Figure 18:
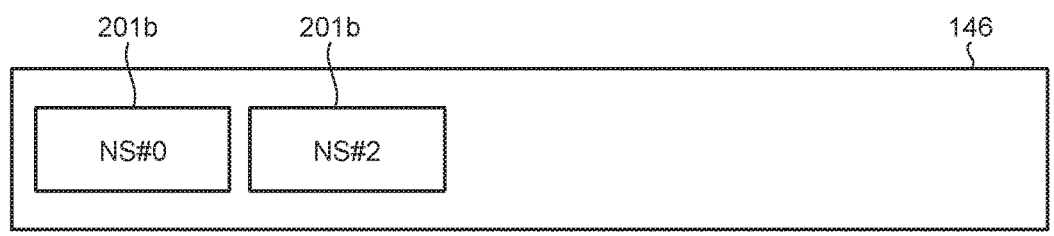
FIG. 18 is a figure explaining a change of a state of storage of each of the first tables.
Figure 19:
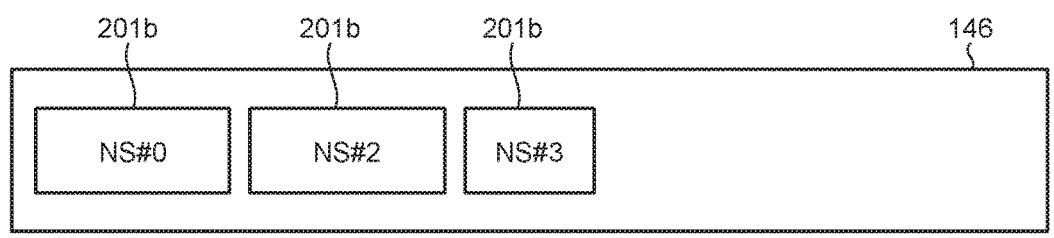
FIG. 19 is a figure explaining a change of a state of storage of each of the first tables.

In a case where the control unit 15 receives an adding request of NS#3 in the state of FIG. 18, the first table 201b of NS#3 is generated at a location continuous to the end of the first table 201b of NS#2 as illustrated in FIG. 19.

It should be noted that the control unit 15 prohibits adding a new name space until the work for eliminating the space has been completed. The first table 201b to be relocated is duplexed until the relocation is completed. In a case where the control unit 15 executes access to the name space in the duplexed first table 201b, both of the first table 201b and the first table 201c are updated when the translation information is updated.

As described above, according to the fourth embodiment, the memory system 1 provides multiple logical address spaces to the outside. In the RAM 14, the first table storage area 146 is allocated. The control unit 15 stores the first tables 201b to the first table storage area 146 for each logical address. The control unit 15 deletes the first tables 201b in accordance with a deletion request from the host 2. The control unit 15 eliminates the vacant area generated between two first tables 201b due to the deletion. In a case where there is a first vacant area between the first table 201b for the first logical address space and the first table 201b for the second logical address space, the control unit 15 relocates the first table 201b for the second logical address space in order to eliminate the first vacant area. More specifically, the control unit 15 copies the first table 201b for the second logical address space to the second vacant area. Then, the control unit 15 deletes the first table 201b of the source of the copy. Then, the control unit 15 further copies the first table 201c for the second logical address space to a location continuous to the first table 201b for the first logical address space of the first vacant area. Then, the control unit 15 deletes the first table 201c for the second logical address space. Therefore, the control unit 15 can store the first table 201b for each logical address to the first table storage area 146 without any vacant area generated therebetween. Therefore, the first table storage area 146 can be efficiently used.

The first table storage area 146 has a size at least twice as large as the maximum value of the total size of the first table 201b. Therefore, the above relocation can be made.

In a case where the first table 201b is updated while the first table 201b is relocated, the control unit 15 updates both of the first table 201b and the first table 201c. Therefore, the consistency of the translation information is maintained.

Fifth Embodiment

The fifth embodiment can be applied to any memory system 1 of the first to the fourth embodiments.

Figure 20:
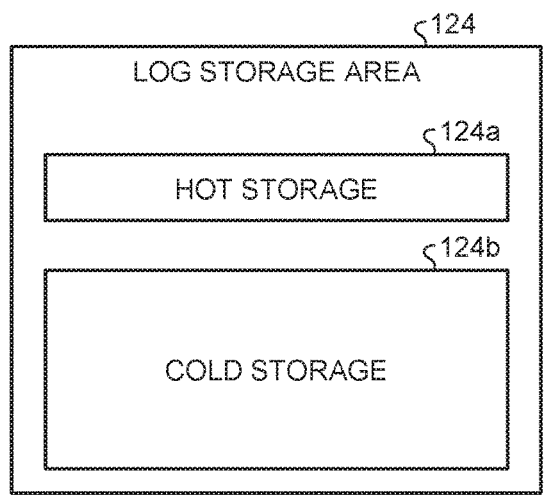
FIG. 20 is a figure illustrating a log storage area according to a fifth embodiment.

FIG. 20 is a figure illustrating a log storage area 124 according to the fifth embodiment. As illustrated in the drawing, a hot storage 124a and a cold storage 124b are allocated in the log storage area 124.

Unit information is input and output into/out of the hot storage 124a in accordance with the rule of FIFO. The control unit 15 writes the dirty unit information to the hot storage 124a. The control unit 15 retrieves the unit information from the hot storage 124a in accordance with the rule of the FIFO, and writes the valid unit information of the retrieved unit information to the cold storage 124b. The valid unit information is unit information directly indicated by the first table 201b or the block management information 211b, or unit information indicated by the second table 202a indicated by the first table 201b.

It should be noted that the sizes of the hot storage 124a and the cold storage 124b may be configured to be variable. For example, when the locality is high, the control unit 15 decreases the size of the hot storage 124a and increases the size of the cold storage 124b. Then, when the locality is low, the control unit 15 decreases the size of the cold storage 124b and increases the size of the hot storage 124a. For example, the control unit 15 measures the ratio of the valid unit information with respect to the output unit information. The control unit 15 can use the measured ratio as the measurement value of the locality.

As described above, according to the fifth embodiment, the log storage area 124 includes the hot storage 124a and the cold storage 124b, and the control unit 15 stores the unit information to any one of the hot storage 124a and the cold storage 124b in accordance with the elapsed time since the update. It should be noted that the log storage area 124 may include three or more areas, and the control unit 15 may store the unit information to any one of three or more areas in accordance with the elapsed time since the update.

Sixth Embodiment

Figure 21:
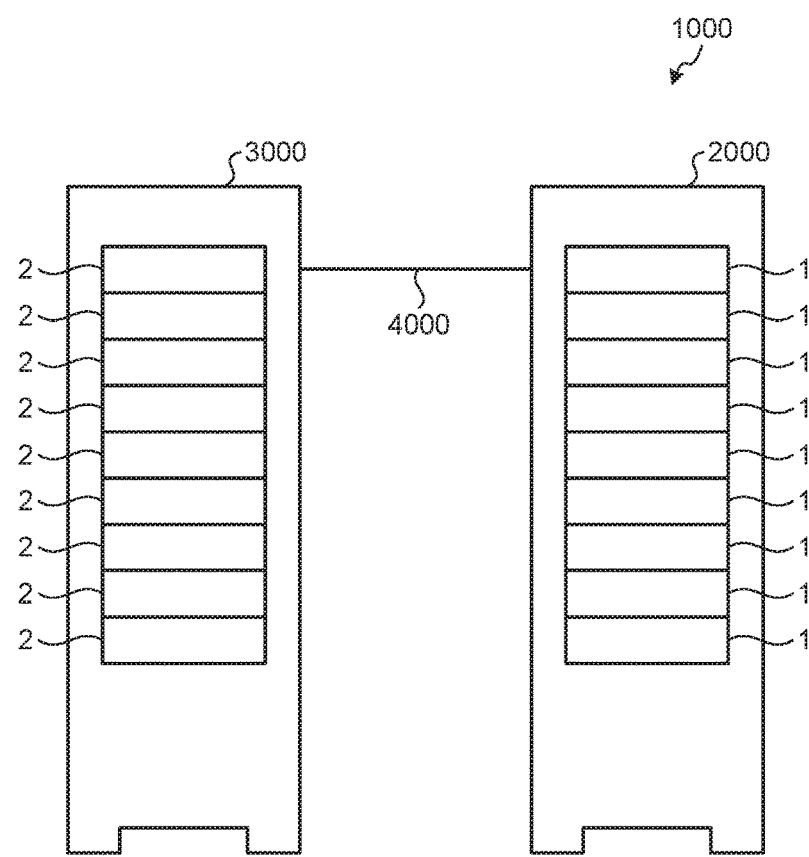
FIG. 21 is a figure illustrating an example of an implementation of a memory system.

FIG. 21 is a figure illustrating an example of an implementation of the memory system 1. The memory system 1 is implemented on, for example, a server system 1000. The server system 1000 is configured by connecting a disk array 2000 and a rack mount server 3000 with a communication interface 4000. Any given standard can be employed as the standard of the communication interface 4000. The rack mount server 3000 is configured by mounting one or more hosts 2 on the server rack. Multiple hosts 2 can access the disk array 2000 via the communication interface 4000.

The disk array 2000 is configured by mounting one or more memory systems 1 on the server rack. Not only the memory system 1 but also one or more hard disk units may be mounted on the disk array 2000. Each memory system 1 can execute a command from each host 2. Each memory system 1 has a configuration in which the first or second embodiment is employed. Therefore, each memory system 1 can easily execute the atomic write.

In the disk array 2000, for example, each memory system 1 may be used as a cache of one or more hard disk units. A storage controller unit for structuring RAID by using one or more memory systems 1 may be mounted on the disk array 2000.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
    a nonvolatile first memory; and
    a control circuit that executes data transfer between the host and the first memory and managing translation information indicating a relation between logical location information and physical location information, the logical location information being location information designated from the host, the physical location information being location information indicating physical location in the first memory,
    wherein the control circuit separates out the translation information into a plurality of levels in a hierarchy, the plurality of levels includes a first level and a second level, the first level is a given level among the plurality of levels, the second level is another given level among the plurality of levels, and the translation information includes first translation information which corresponds only to the first level and second translation information which corresponds only to the second level, and
    the size of the first translation information and the size of the second translation information are the same,
    wherein the first memory includes a first area, and
    the control circuit stores the first translation information and the second translation information to the first area.

2. The memory system according to claim 1, wherein the first area includes two pages each being a unit of writing to the first memory, and
    the control circuit stores the first translation information and the second translation information to a same page.

3. The memory system according to claim 2 further comprising a second memory,
    wherein the control circuit reads the first translation information and the second translation information from the first area to the second memory, uses the first translation information and the second translation information stored in the second memory, and stores the first translation information and the second translation information having been used to the first area.

4. The memory system according to claim 1, wherein the first memory includes a second area in which the control circuit writes data from the host,
    the control circuit manages state management information indicating whether data in the second area are in a first state or in a second state, and the size of the first translation information, the size of the second translation information, and the size of the state management information are the same.

5. The memory system according to claim 4, wherein the control circuit stores the first translation information, the second translation information, and the state management information to the first area.

6. The memory system according to claim 5, wherein the first area includes two pages each being a unit of writing to the first memory, and
the control circuit stores the first translation information, the second translation information, and the state management information to a same page.

7. The memory system according to claim 6 further comprising a second memory,
the control circuit reads the first translation information, the second translation information, and the state management information from the first area to the second memory, uses the first translation information, the second translation information, and the state management information stored in the second memory, and stores the first translation information, the second translation information, and the state management information having been used to the first area.

8. The memory system according to claim 4, wherein the control circuit stores first data to a first location in the second area, and stores, to a second location, second data which is latest data of data designated by the same logical location information as the first data,
the state of the first data is managed as the first state, and the state of the second data is managed as the second state.

9. A memory system connectable to a host, the memory system comprising:
a nonvolatile first memory; and
a control circuit that executes data transfer between the host and the first memory and managing translation information indicating a relation between logical location information and physical location information, the logical location information being location information designated from the host, the physical location information being location information indicating physical location in the first memory,
wherein the control circuit separates out the translation information into a plurality of levels in a hierarchy, and the translation information includes first translation information which belongs to the first level in the hierarchy and second translation information which belongs to the second level in the hierarchy,
the size of the first translation information and the size of the second translation information are the same;
the first memory includes a first area which includes two pages each being a unit of writing to the first memory; and
the control circuit stores the first translation information and the second translation information to a same page in the first area.

10. The memory system according to claim 9 further comprising a second memory,
wherein the control circuit reads the first translation information and the second translation information from the first area to the second memory, uses the first translation information and the second translation information stored in the second memory, and stores the first translation information and the second translation information having been used to the first area.

11. The memory system according to claim 9, wherein the first memory includes a second area in which the control circuit writes data from the host,
the control circuit manages state management information indicating whether data in the second area are in a first state or in a second state, and
the size of the first translation information, the size of the second translation information, and the size of the state management information are the same.

12. The memory system according to claim 11, wherein the control circuit stores the first translation information, the second translation information, and the state management information to a same page in the first area.

13. The memory system according to claim 12 further comprising a second memory,
the control circuit reads the first translation information, the second translation information, and the state management information from the first area to the second memory, uses the first translation information, the second translation information, and the state management information stored in the second memory, and stores the first translation information, the second translation information, and the state management information having been used to the first area.

14. The memory system according to claim 11, wherein the control circuit stores first data to a first location in the second area, and stores, to a second location, second data which is latest data of data designated by the same logical location information as the first data,
the state of the first data is managed as the first state, and the state of the second data is managed as the second state.

15. A memory system connectable to a host, the memory system comprising:
a nonvolatile first memory; and
a control circuit that executes data transfer between the host and the first memory and managing translation information indicating a relation between logical location information and physical location information, the logical location information being location information designated from the host, the physical location information being location information indicating physical location in the first memory,
wherein the control circuit separates out the translation information into a plurality of levels in a hierarchy, and the translation information includes first translation information which belongs to the first level in the hierarchy and second translation information which belongs to the second level in the hierarchy, and
the first memory includes a two pages each being a unit of writing to the first memory; and
the control circuit stores the first translation information and the second translation information to a same page.

* * * * *